(12) United States Patent
Kanemaru et al.

(10) Patent No.: US 6,496,358 B2
(45) Date of Patent: *Dec. 17, 2002

(54) BREAKER APPARATUS AND BREAKER UNIT

(75) Inventors: Yasuhisa Kanemaru, Fukuoka (JP);
Takahisa Yoshizumi, Fukuoka (JP);
Kazunori Oomori, Fukuoka (JP);
Yoshiaki Tobimatsu, Fukuoka (JP);
Yasunori Murata, Fukuoka (JP);
Mitsuru Etou, Fukuoka (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/223,556

(22) Filed: Dec. 30, 1998

(65) Prior Publication Data
US 2002/0105399 A1 Aug. 8, 2002

(30) Foreign Application Priority Data
Jul. 6, 1998 (JP) ............................................. 10-190479

(51) Int. Cl.⁷ ................................................. H02B 1/26
(52) U.S. Cl. ..................... 361/601; 361/624; 361/725; 361/730; 361/787; 361/791; 361/799
(58) Field of Search .............................. 335/6, 8, 202; 361/624, 631, 601, 634–636, 652–656, 673, 725, 728, 730, 753, 787, 791, 796, 799, 800, 816, 818

(56) References Cited

U.S. PATENT DOCUMENTS 5,638,255 A * 6/1997 Bobadilla et al. ........... 361/624

FOREIGN PATENT DOCUMENTS

| JP | 2-303324 | 12/1990 |
| JP | 5-304711 | 11/1993 |
| JP | 8-251729 | 9/1996 |

* cited by examiner

Primary Examiner—Ramon M. Barrera
(74) Attorney, Agent, or Firm—Katten Muchin Zavis Rosenman

(57) ABSTRACT

The present invention relates to a breaker apparatus and breaker unit. The breaker apparatus comprises a breaker unit including a power supply/cut-off breaker part, a power connecting part, a first unit connecting part, a ground connecting part and a second unit connecting part and further comprises a breaker unit mounting board including a mating power connecting part, a mating ground connecting part, a first connection mediating part and a second connection mediating part. This breaker apparatus is capable of constituting a power distributing apparatus with a necessary but minimized construction, and of extending the breaker unit in a minimum unit according to necessity. In addition, with this breaker apparatus, parts can be used in common irrespective of a change of a ground system, and further, can be replaced in the hot-line condition without cutting off the power supply to a system.

27 Claims, 20 Drawing Sheets

BREAKER APPARATUS AND BREAKER UNIT

BACKGROUND OF THE INVENTION (1) Field of the Invention

The present invention relates to a breaker apparatus and breaker unit suitably applicable to a power distributing apparatus for use in communication systems.

(2) Description of the Related Art

In a terminal station of a communication system, a breaker apparatus is provided in a power distributing apparatus which is for the purpose of distributing power, fed through a power-supply line, to each of units in that station. The breaker apparatus is made up of a breaker (NFB: Non Fuse Breaker) which serves as a current limiter for, when a current exceeding a predetermined value flows, breaking that current, with a current supplied being made to be fed through the NFB to each of the units so that the supply of an excessive current exceeding an allowable value of each of the units thereto is preventable.

Meanwhile, for coping with a system extension in the future, a communication system is usually designed in consideration of the enlargement of an exchange system associated with the extension of that communication system. Accordingly, in a power distributing apparatus including such a prior breaker apparatus, the power-supply ability per one rack column is determined on the basis of the maximum number of racks or units in the station, and the power distributing apparatus is designed and manufactured to exhibit the maximum power-supply ability.

In addition, the communication system is requested to execute the maintenance without its stopping, and therefore, employs a double-powered construction.

There are a CG (Communication Ground) forming a return ground for a power supply, a SG (Signal Ground) being a ground for a signal, and an FG (Frame Ground) for human-body protection among the kinds of grounding for a communication system,. Further, the ground systems are classified into an isolated ground system and an integrated ground system, and in the case of communication systems installed overseas, either the isolated ground system or the integrated ground system is taken according to the standard the nation concerned employs.

The isolated ground system is principally employed in Japan, European nations and other countries, and in this system, all the ground earths are gathered at a GW (Ground Window) in a station house and then connected to a main ground at one point (see FIG. 3). Thus, since the isolated ground system takes a structure in which the FGs are connected at one point, an advantage exists in that, even if that building is struck by thunderbolt or the like, it is difficult that the noises caused by the thunderbolt or the like are introduced through the FGs into the system, whereas there is a disadvantage in that the ground lines are led from the communication system to a power room of each of the units to cause a higher wiring cost.

The integrated ground system is principally employed in the United States of America and others, and each of the grounds within the communication system is connected to a CG within a power distributing apparatus (see FIG. 16) which in turn, is connected to an FG of an exchange system. Further, the CG in the power distributing apparatus is connected as a power supply return in the power room to a rectifier.

This integrated ground system does not require the leading of the SG from the communication system to the external but requires only a connection of the FG of the power distributing apparatus to a neighboring FG of, for example, an exchange system, and therefore, the ground line wiring work is facilitated to decrease the wiring work cost, and the requirement to the electric insulation of the communication system from the station house building does not necessarily exist, and hence, a spanning cable rack or the like of the communication system is not needed to be electrically insulated from the station house constructing materials, which facilitates the associated works and lowers the wiring work cost, so that its construction cost becomes lower than that of the aforesaid isolated ground system. However, when being used for a large-scale communication system, this integrated ground system shows a disadvantage of being poor at noises because, at the falling of a thunderbolt, the thunderbolt noises are introduced through a shield for signal cables existing between spanning rows into the building.

The selection between the isolated ground system and the integrated ground system depends upon the standard ruled by the nation employing the communication system, and the ground system meeting the standard by that nation is chosen, whereupon a power distributing apparatus and a communication system are produced accordingly.

In the case of a power distributing apparatus equipped with such a prior breaker apparatus, since difficulty is experienced to perform the extension of the NFB or the like resulting from the enlargement of the power-supply capacity, as mentioned before, in the design of the power distributing apparatus, in consideration of the future extension of the exchange system or the like, the power-supply ability per one rack column, and in its turn the breaker capacity, is designed on the basis of the maximum number of racks in the station.

Accordingly, the power distributing apparatus with the prior breaker apparatus is constructed to provide a breaker capacity corresponding to the maximum power-supply ability at all the time, with the result that the manufacturing cost of the power distributing apparatus increases. Further, in a small-scale communication system (small station system), the rate of the cost of the power distributing apparatus to the total system cost rises, and the rise of the power distributing apparatus cost hinders lowering the total system cost, thus reducing the cost advantage on the market when being applied to a small station system.

Furthermore, in the recent years, with the improvement of the functions of the units constituting a communication system, its densification advances, with the result that the power consumption increases in units of units or in units of racks, and hence, since a consideration should be given to a power-supply ability covering this increasing power consumption at the above-mentioned design of the power distributing apparatus, the power-supply capacity of the power distributing apparatus further increases to further heighten the manufacturing cost of the power distributing apparatus.

Still further, although the communication system is required to undergo maintenance without stopping and, hence, its power supply system employs a double-powered construction, in the case of a power distributing apparatus equipped with a prior breaker unit, the replacement of the NFB or the extension of the power distributing apparatus requires that the power supply to the distribution board to be replaced is turned off or that the work for the replacement or the extension is done risking the short-circuit accident in the hot-line condition without turning off the power supply, which creates a problem in the stabilization of the system operation.

Besides, since the NFB is attached through screws to the power distributing apparatus, there is a problem in that the replacement work efficiency of the NFB deteriorates.

Moreover, because the determination as to whether the ground system is constructed as the isolated ground system or as the integrated ground system relies upon the standard taken by the nation installing the communication system and the power distributing apparatus is to be manufactured to be conformable to that nation, there is a problem in that difficulty is encountered to commonly use the products, which causes the increase in the number of parts so that the manufacturing cost goes up.

SUMMARY OF THE INVENTION

The present invention has been developed with a view to eliminating the above-mentioned problems, and it is therefore an object of this invention to provide the improvement of constructions of a breaker apparatus and breaker unit which is capable of not only constituting a power distributing apparatus with a necessary but minimized construction along with extending breaker units in the minimum unit as needed, but also commonly using parts irrespective of the change of the ground system, and even allowing the replacement work in the hot-line condition without the suspension of the power supply to the system.

For these purposes, in accordance with this invention, there is provided a breaker apparatus comprising a breaker unit including a breaker part for supplying/cutting off power, a power connecting part for connecting the breaker part to a power line, a first unit connecting part for supplying power through the breaker part to a unit side, a ground connecting part to be connected to a ground line, and a second unit connecting part for connecting the unit side through the ground connecting part to the ground line, and further comprising a breaker unit mounting board including a mating power connecting part on which the power connecting part is detachably mountable, with the mating power connecting part connecting the power connecting part to the power line when the power connecting part is mounted thereon, a mating ground connecting part on which the ground connecting part is detachably mountable, with the mating ground connecting part connecting the ground connecting part to the ground line when the ground connecting part is mounted thereon, a first connection mediating part allowed to connect a power supply line to the unit side and the first unit connecting part and a second connection mediating part allowed to connect a ground line to the unit side to the second unit connecting part.

Thus, owing to the breaker apparatus according to this invention, a power distributing apparatus can be constructed through the use of a breaker unit with a necessary but minimized power capacity and, hence, can be manufactured at a minimum cost, thus reducing the system manufacturing cost. In addition, particularly, in constructing a small station system, the useless initial investment is reducible and the rate of the cost of the power distributing apparatus to the total manufacturing cost is lowered.

In this case, it is also acceptable that the breaker unit is equipped with a board member on which disposed are the aforesaid breaker part, power connecting part, first unit connecting part, ground connecting part and second unit connecting part, and the board member is provided with a first connecting line for connecting the breaker part to the power connecting part, a second connecting line for connecting the breaker part to the first unit connecting part and a third connecting line for connecting the ground connecting part to the second unit connecting part.

Accordingly, the above-described breaker apparatus according to this invention can achieve the size-reduction of the breaker unit to construct the breaker unit as a small-sized unit, and can easily produce the power distributing apparatus in accordance with a required power capacity, and further, facilitate the replacement of the breaker unit at the system maintenance, the enlargement of the breaker unit and other operations to enhance the working efficiency.

In addition, it is also possible that the aforesaid power connecting part is made up of a power connecting piece member having a piece portion and a leg portion constructed such that at least their surface portions serve as electric conducting portions, and a first connecting part electrically connected to the leg portions of the power connecting piece member is formed in the first connecting line.

With this construction, the breaker apparatus according to this invention allows the power connecting piece member to be easily connected to the first connecting line, which simplifies the construction of the breaker unit and reduces the manufacturing cost.

Furthermore, it is also appropriate that the foregoing first connecting part is provided with a plurality of connecting portions arranged at a predetermined interval along a portion facing the mating power connecting part so that the first connecting part is electrically connectable to the leg portions of the power connecting piece member.

With this construction, the breaker apparatus according to this invention can increase and decrease the number of the power connecting piece members, with the result that the useless initial investment is held down while the manufacturing cost is cut down.

Besides, it is also possible to place a holder for connecting the adjacent power connecting piece members to each other.

Thus, in the breaker apparatus according to this invention, the power connecting piece members are preventable from falling down, and hence, the electrical connection between the power connecting piece members and the mating power connecting part is surely maintainable, thereby improving the reliability of the device.

Still further, it is also appropriate that the foregoing first connecting part is equipped with a plurality of connecting portions arranged at a predetermined interval along a direction crossing a portion facing the mating power connecting part to be electrically connectable to the leg portions of the power connecting piece members.

As a result of this construction, in the breaker apparatus according to this invention, the power connecting piece members in the first connecting part can be disposed at a desired position.

Moreover, it is also acceptable that the aforesaid ground connecting part is made up of a ground connecting piece member having a piece portion and a leg portion constructed such that at least their surface portions serve as electric conductive portions, and a second connecting part electrically connected to the leg portions of the ground connecting piece members is formed in the third connecting line.

Whereupon, the breaker apparatus according to this invention can simplify the construction of the breaker unit and reduce its manufacturing cost.

Furthermore, it is also acceptable that the aforesaid second connecting part is equipped with a plurality of connecting portions arranged at a predetermined interval along a portion facing the mating ground connecting part so that it is electrically connectable to the leg portions of the plurality of ground connecting piece members.

Thereupon, in the breaker apparatus according to this invention, the number of the ground connecting piece members can be increased and decreased when necessary, and the useless initial investment can be held down while the manufacturing cost can be cut down.

Besides, it is also possible to place a holder for mutually connecting the adjacent ground connecting piece members.

Accordingly, in the breaker apparatus according to this invention, the ground connecting piece members are preventable from falling down, and hence, the electrical connection between the ground connecting piece members and the mating ground connecting part is surely maintainable, thereby improving the reliability of the device.

Still further, it is also appropriate that the aforesaid second connecting part is equipped with a plurality of connecting portions arranged at a predetermined interval along a direction crossing a portion facing the mating ground connecting part to be electrically connectable to the leg portions of the ground connecting piece members.

Accordingly, in the breaker apparatus according to this invention, the ground connecting piece members in the second connecting part can be disposed at a desired position.

Still further, it is also appropriate that, at the mounting of the breaker unit on the breaker unit mounting board, the connection between the ground connecting part and the mating ground connecting part is done prior to the connection between the power connecting part and the mating power connecting part, while at the detachment of the breaker unit from the breaker unit mounting board, releasing the ground connecting part and the mating ground connecting part from their connection is made after releasing the power connecting part and the mating power connecting part from their connection.

Thereupon, in the breaker apparatus according to this invention, in the attachment/detachment of the breaker unit to/from the breaker unit mounting board, the connection between the ground connecting part and the mating ground connecting part is always established at the connection between the power connecting part and the mating power connecting part and the releasing from this connection, and therefore, even when the breaker unit is attached/detached to/from the breaker unit mounting board in the hot-line condition, the earth line is securable, thus improving the safety.

Besides, the aforesaid first and second unit connecting parts can also be mounted on a common first connector part, whereupon, in the breaker apparatus according to this invention, the wiring becomes simple to reduce the manufacturing cost, and the working efficiency of the attachment/detachment of the breaker unit to/from the breaker unit mounting board is improvable.

Moreover, it is also appropriate that the breaker unit mounting board is composed of an insulating plate member, a first conductive plate member mounted on one surface of the insulating plate member to constitute the mating power connecting part, a power line connecting part provided on the other surface of the insulating plate member to be used for the power line, a second conductive plate member mounted on the one surface of the insulating plate member to organize the mating ground connecting part, and a ground line connecting part provided on the other surface of the insulating plate member to be used for the ground line.

With this construction, in the breaker apparatus according to this invention, the breaker unit mounting board can be made with a simple construction so that the manufacturing cost is reducible, and further, the breaker unit mounting board can be constructed to have a small dimension so that the size reduction of the device is achievable.

Besides, the mating power connecting part can also have an engaging hole portion accommodating the power connecting piece member and electrically connected to the power line.

Thus, in the breaker apparatus according to this invention, the easy connection between the power connecting piece member and the power line and the releasing thereof from the connection become feasible, thereby enhancing the working efficiency.

In addition, the mating ground connecting part can also have engaging hole portions accommodating the ground connecting piece members and electrically connected to the ground line.

Thus, in the breaker apparatus according to this invention, the easy connection between the ground connecting piece members and the ground line and the releasing thereof from the connection become feasible, thereby enhancing the working efficiency.

Furthermore, it is also appropriate that a connecting portion to the power supply line extending toward the unit side and a connecting portion to the ground line extending toward the unit side are mounted on a common second connector part while the second connector part and the first connector part are made to be connectable to each other.

With this structure, in the breaker apparatus according to this invention, the wiring becomes simple and the manufacturing cost is reducible, besides the working efficiency of the attachment/detachment of the breaker unit to/from the breaker unit mounting board is improvable.

Still further, it is also acceptable that the aforesaid first and second connection mediating parts are constructed as a connector through-hole for enabling the first and second connector parts to be connected to each other.

Accordingly, in the breaker apparatus according to this invention, the wiring becomes simple and the manufacturing cost is reducible, and further, the working efficiency of the attachment/detachment of the breaker unit to/from the breaker unit mounting board is improvable, besides the construction of the breaker unit mounting board can be simplified and the manufacturing cost can be cut down.

In addition, the ground connecting part can also be constructed as a ground connecting part to be connected to one kind of ground line, and therefore, the breaker apparatus according to this invention contributes to an easy arrangement of an isolated ground system and further to the reduction of the manufacturing cost.

Besides, the ground connecting part can also be constructed as a ground connection part to be connected to a plurality of kinds of ground lines, and therefore, the breaker apparatus according to this invention contributes to an easy arrangement of an integrated ground system and further to the reduction of the manufacturing cost.

Moreover, the ground connecting part can also be equipped with a ground fixed connection portion to be fixedly connected to one type of ground line, and a connecting switch portion allowed to connect the ground fixed connection portion to a different type of ground line. Therefore, in the breaker apparatus according to this invention, the one type of ground line and the different type of ground line can share the breaker unit, thereby lowering the manufacturing cost.

Furthermore, the breaker part can also be made as a non-fuse breaker, and hence, with the breaker apparatus according to this invention, the operations/practical use of the breaker unit become easy and the running cost comes down.

In addition, in accordance with this invention, there is provided a breaker apparatus comprising a breaker unit including a non-fuse breaker part for supplying and cutting off power, a power connecting part composed of a power connecting piece member having a piece portion and a leg portion formed such that at least their surface portions serve as conductive portions for connecting the non-fuse breaker part to a power line, a ground connecting part composed of a ground connecting piece member having a piece portion and a leg portion formed so that at least their surface portions serve as conductive portions for connection with a ground line, a unit connecting part for supplying power through the non-fuse breaker part to a unit side and further for connecting the unit side through the ground connecting part to the ground line, and a substrate or board member for holding the breaker part, the power connecting part, the ground connecting part and the unit connecting part, and for carrying a fourth connecting line having a first engaging section for making a connection between the non-fuse breaker part and the power connecting part and allowed to engage with the leg portion of the power connecting piece member and a fifth connecting line for making a connection between the non-fuse breaker part and the unit connecting part and a connection between the ground connecting part and the unit connecting part, and further, comprising a breaker unit mounting board, in correspondence with each of the plurality of breaker units, including a mating power connecting part having an engaging hole portion allowed to engage with the power connecting piece member and electrically connected to the power line for allowing detachable mounting of the power connecting part and for connecting the power connecting part to the power line when the power connecting part is mounted on the mating power connecting part, a mating ground connecting part having an engaging hole portion allowed to engage with the ground connecting piece member and electrically connected to the ground line for allowing detachable mounting of the ground connecting part and for connecting the ground connecting part to the ground line when the ground connecting part is mounted on the mating ground connecting part, and a connection mediating part for making a connection between a power supply line extending toward the unit side and the unit connecting part and for making a connection between a ground line to the unit side and the unit connecting part.

Thus, the above-mentioned breaker apparatus according to this invention can provide the following advantages.

(1) Since a power distributing apparatus can be constructed with breaker units each having a necessary but minimized power capacity, the power distributing apparatus is producible at a minimum cost and the system manufacturing cost is reducible. In addition, particularly, in constructing a small station system, the useless initial investment is held down and the rate of the cost of the power distributing apparatus to the total manufacturing cost is lowered. Further, the size reduction of the breaker unit is achievable and the breaker unit can be constructed as a small-sized unit and the power distributing apparatus can easily be constructed to a required power capacity. Still further, the replacement of the breaker unit at the maintenance of the system or the like, the extension of the breaker unit and others are facilitated to enhance the working efficiency.

(2) The construction of the breaker unit is simple, so that the manufacturing cost is reducible.

(3) The connection and release from the connection between the power connecting piece member and the power line is easy, thus improving the working efficiency.

(4) The connection and release from the connection between the ground connecting piece member and the ground line is easy, thus improving the working efficiency.

(5) The operations/practical use of the breaker unit become simple, and the running cost is reducible.

Moreover, in accordance with this invention, there is provided a breaker unit comprising a breaker part for supplying and cutting off power, a power connecting part for connecting the breaker part to a power line, a first unit connecting part for supplying power through the breaker part to a unit side, a ground connecting part to be connected to a ground line, and a second unit connecting part for connecting the unit side through the ground connecting part to the ground line.

Accordingly, the breaker unit according to this invention can constitute a power distributing apparatus in a state of having a necessary but minimum power capacity, and hence, contributes to the manufacturing of the power distributing apparatus at the minimum cost and consequently cuts down the system manufacturing cost. In addition, in constructing a small station system, the useless initial investment is held down and the rate of the cost of the power distributing apparatus to the total manufacturing cost comes down.

DESCRIPTION OF THE PREFERRED EMBODIMENTS

Embodiments of the present invention will be described hereinbelow with reference to the drawings.

(A) Description of a First Embodiment of this Invention

Figure 1:
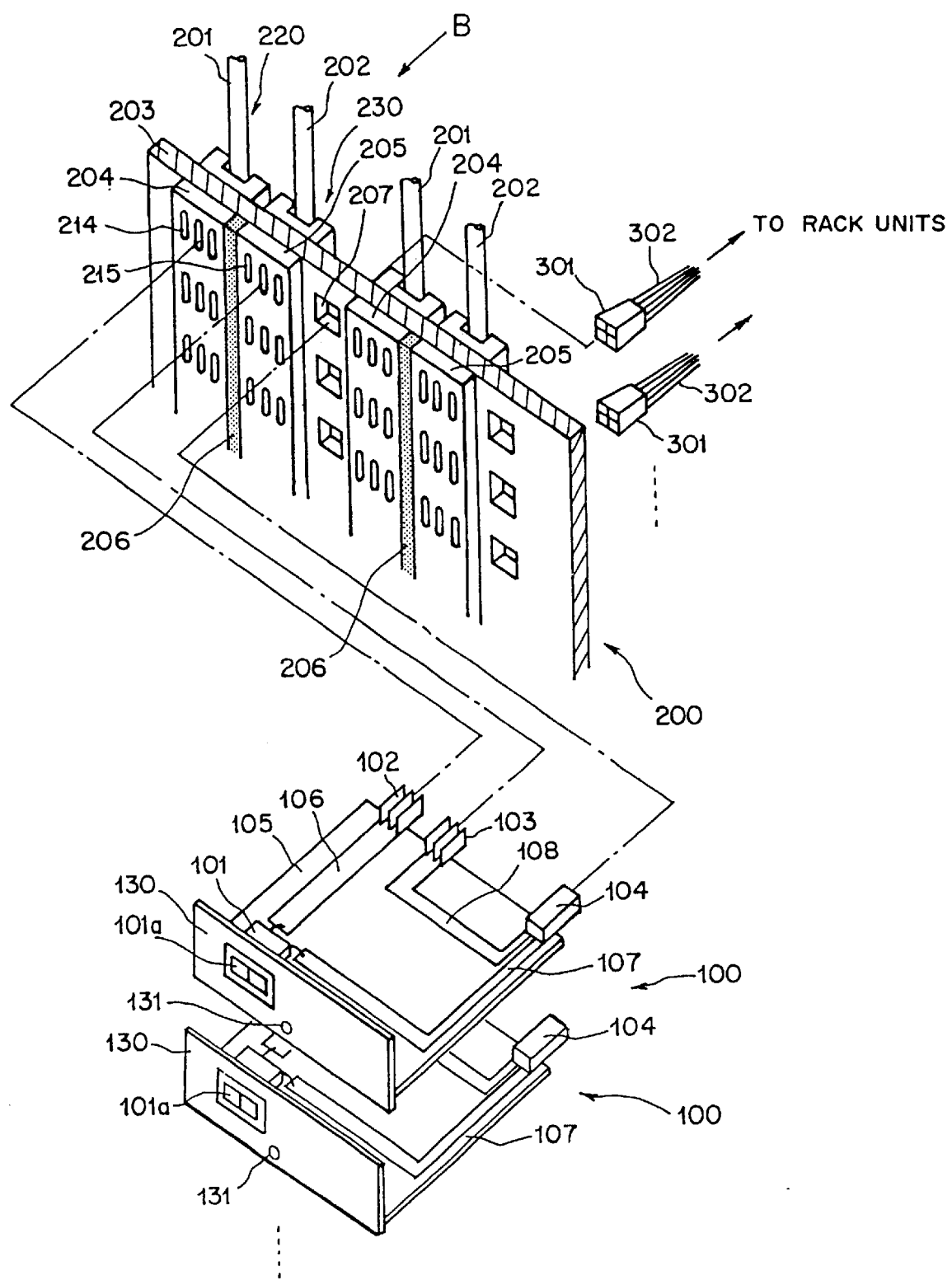
FIG. 1 is a partial perspective view illustratively showing a construction of a breaker apparatus according to a first embodiment of the present invention.
Figure 2:
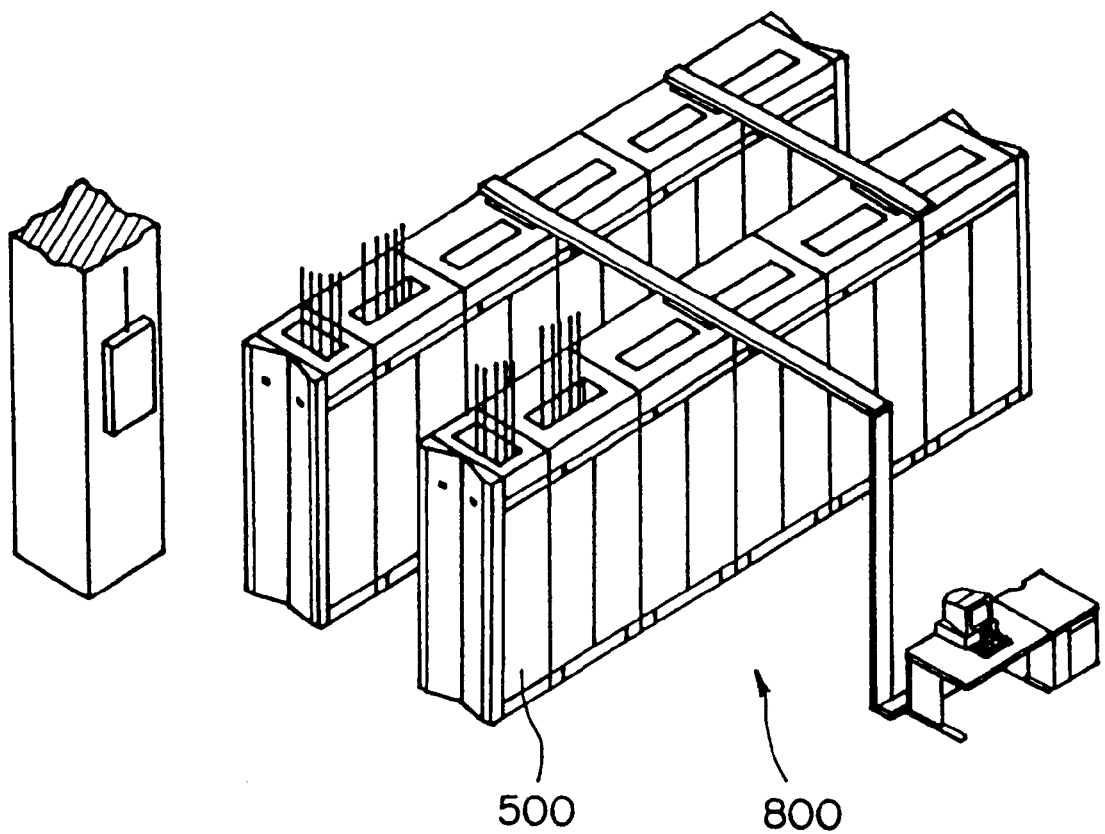
FIG. 2 is a perspective view illustratively showing a construction of a communication system on which a breaker apparatus according to this invention is mounted.
Figure 3:
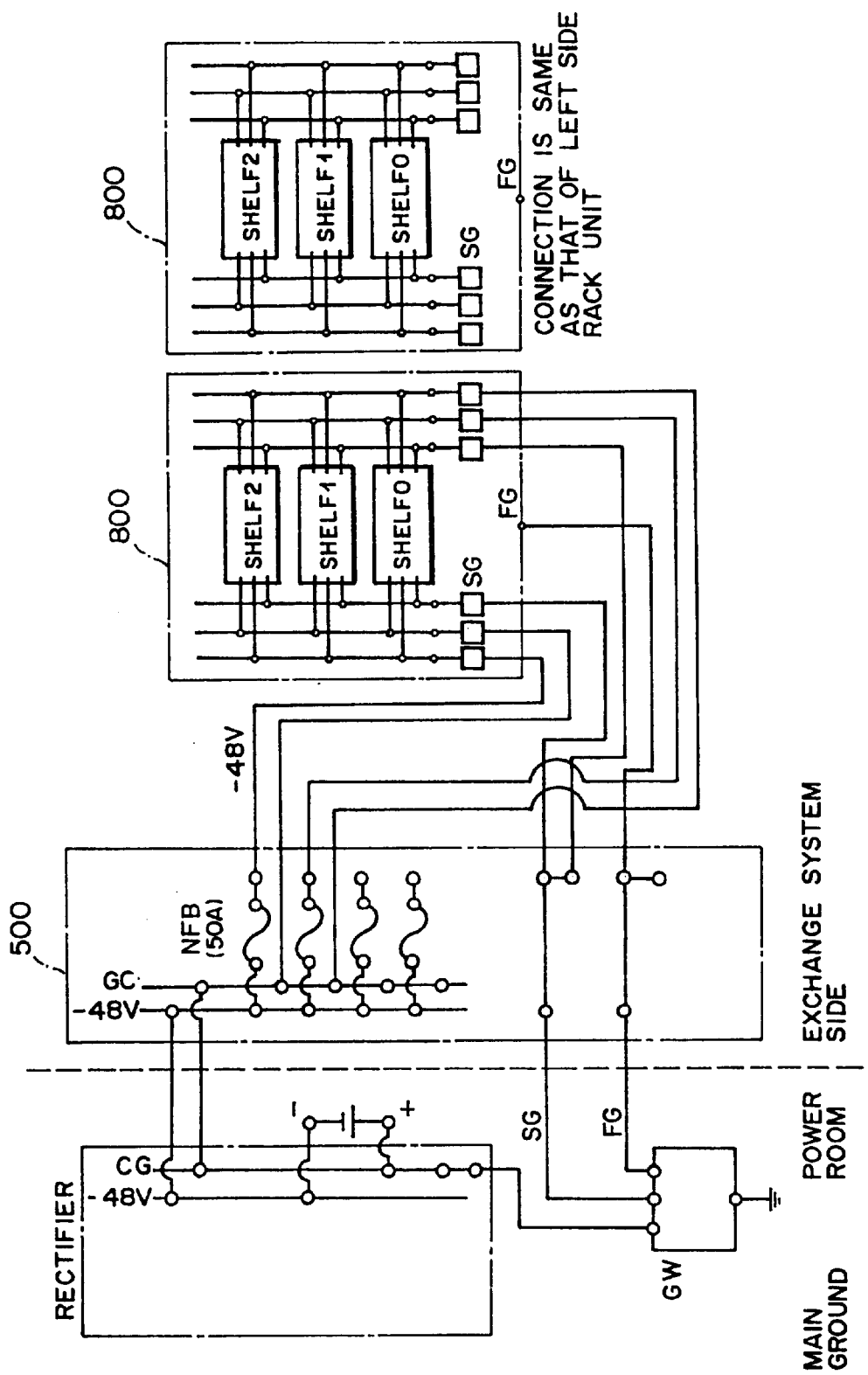
FIG. 3 is a wiring diagram illustratively showing an arrangement of an isolated ground system.

FIG. 1 is a partial perspective view illustratively showing a construction of a breaker apparatus according to a first embodiment of the present invention, FIG. 2 is a perspective view illustratively showing a construction of a communication system on which a breaker apparatus according to this invention is mounted, and FIG. 3 is a wiring diagram illustratively showing an arrangement of an isolated ground system.

The breaker apparatus according to the first embodiment, shown in FIG. 1, is applicable to a power distributing apparatus 500 in one terminal station of a communication system shown in FIG. 2, and is for distributing power, fed through a power supply line (power line) 201, to various types of units (rack units in the example of FIG. 2) 800 placed in rack columns while preventing an excessive current, exceeding the tolerance of each of the rack units 800, from flowing thereinto, and constitutes an isolated ground system shown in FIG. 3.

The breaker unit according to the first embodiment is, as shown in FIG. 1, composed of a plurality of breaker units 100 and a breaker unit mounting board 200.

Each of the breaker units 100 is made up of an NFB 101, a power connecting part 102, a ground connecting part 103 and a first connector part 104 which are placed on a substrate member 105.

The NFB 101 acts as a power supply/cutoff breaker part and serves as a current limiter for, when a current exceeding a predetermined value internally flows, cutting off that current, and the current given is supplied through this NFB to each of units to prevent an excessive current exceeding the tolerance of the NFB 101 from flowing into each of the units in the after-processing stages. Further, the NFB 101 is composed of a non-fuse breaker, and is constructed as a current limiter in the power distributing apparatus as a power capacity in a predetermined minimum unit.

This NFB 101 is attached to a panel 130 standing from one side surface of the substrate member 105 to be perpendicular to the substrate member 105, and an operating switch 101a of the NFB 101 is made to be operated from the front side of the panel 130 (the opposite side of the panel 130 to the side on which the substrate member 105 is joined).

Furthermore, a fitting hole 131 is made at a position of the panel 130 below the joining position to the substrate member 105 in its vertical direction and at a central position of the panel 130 in its horizontal direction.

In addition, on the substrate member 105, the NFB 101 and the power connecting part 102 are electrically connected through a first connecting line 106 (fourth connecting line) to each other, while the NFB 101 and the first connector part 104 are connected through a second connecting line 107 (fifth connecting line) to each other, and even, the ground connecting part 103 and the first connector part 104 are connected through a third connecting line 108 to each other.

The first connecting line 106, the second connecting line 107 and the third connecting line 108 are constructed by electric conductive patterns made of a conductive metal or the like and formed on the substrate member 105 using an etching technique or the like.

Figure 4:
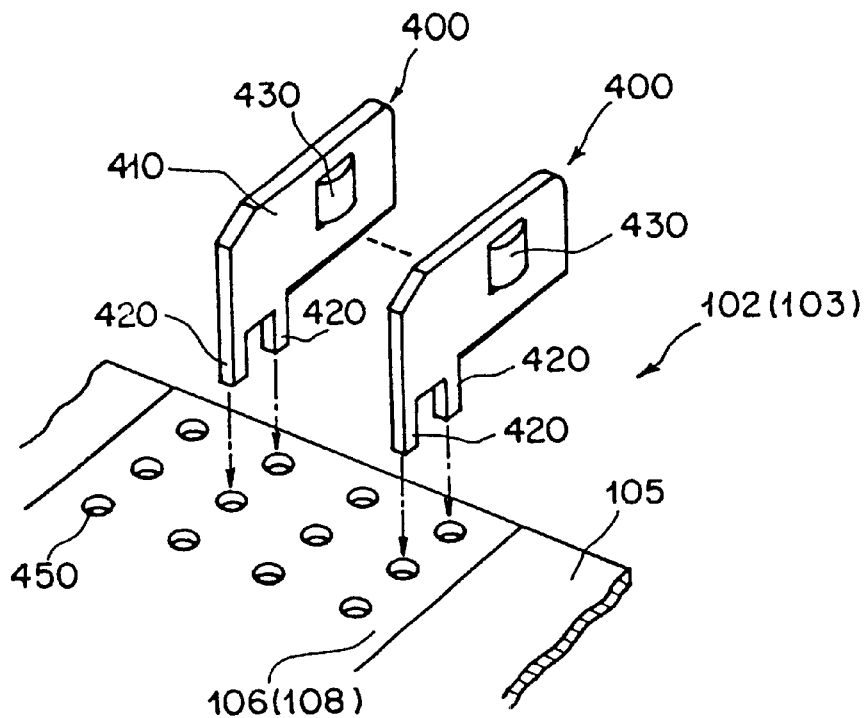
FIG. 4 is a perspective view illustratively showing a construction of a power connecting part.
Figure 5:
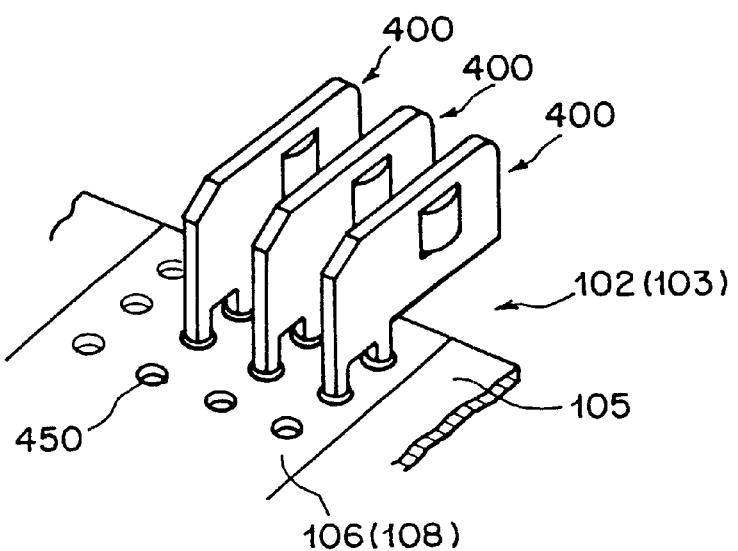
FIG. 5 is a perspective view illustratively showing the construction of the power connecting part.
Figure 6A:
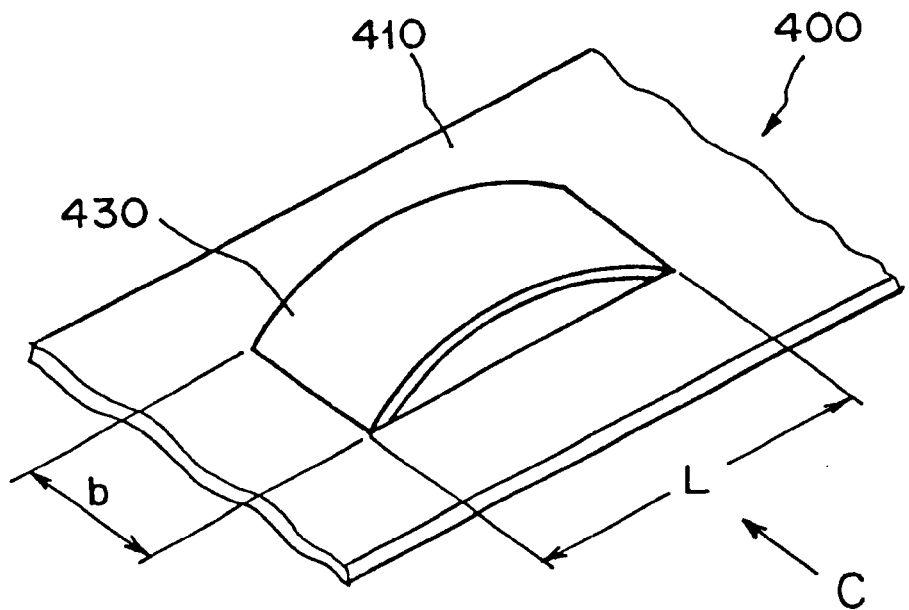
FIG. 6A is a partially broken illustration of a piece member.
Figure 6B:
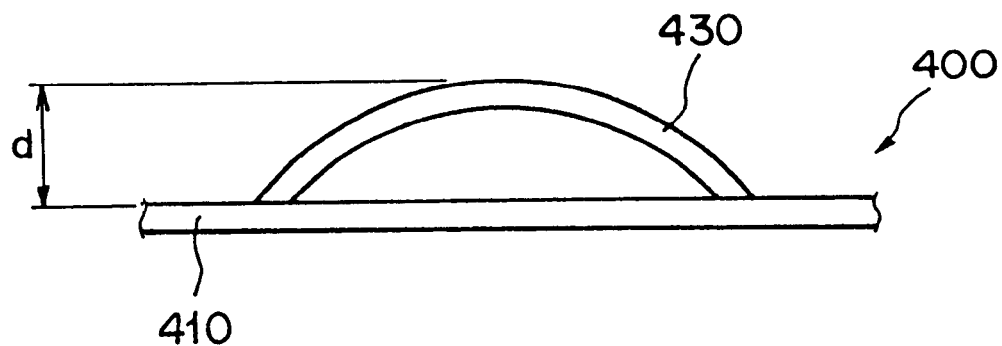
FIG. 6B is an illustration of the piece member viewed from a direction indicated by an arrow C in FIG. 6A.
Figure 7:
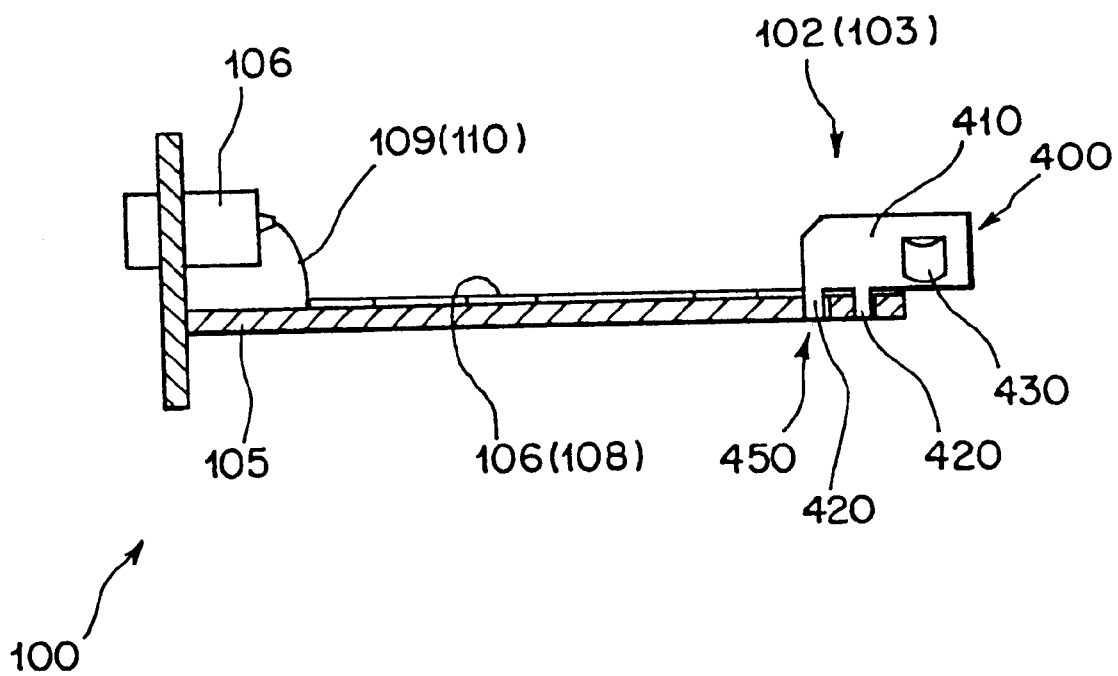
FIG. 7 is a side elevational view showing a breaker unit according to the first embodiment.

FIGS. 4 and 5 are perspective views illustratively showing a construction of the power connecting part 102, FIG. 6A is a partially broken illustration of a piece member 400, FIG. 6B is an illustration of the piece member 400 viewed from a direction indicated by an arrow C in FIG. 6A, and FIG. 7 is a side elevational view showing the breaker unit 100. As shown in FIGS. 4 and 5, the power connecting part 102 is made up of a plurality of (3 in FIG. 5) piece members 400 (power connecting piece members). In FIG. 4, a portion of the piece members 400 is omitted for convenience in description only.

Each of the piece members 400 is made from a conductive metal (for example, phosphor bronze) plate, and is composed of a piece portion 410 having a substantially rectangular configuration, and two leg portions 420, 420 protruding in parallel with each other from the piece portion 410. Further, conductive metallic thin-films (for example, tin or gold) are respectively formed on the surface portions of the piece portion 410 and the leg portions 420, 420 according to a deposition or plating technique.

In addition, a plate-spring-like contact portion 430 is formed in the vicinity of a central portion of the piece portion 410 as shown in FIGS. 6A and 6B. This contact portion 430 is made such that two cuts (length L) are made in parallel to make a predetermined interval (length b) and a portion existing between these cuts is pressed from one side to project to the other side (thickness d), and serves as a plate spring.

A detailed description will be given hereinbelow of a structure of the contact portion 430 of the piece member 400.

When a modulus of longitudinal elasticity (for example, in the case of phosphor bronze, $4.36 \times 10^{10}$ N/m2) is taken to be E, an external force (contacting force) is taken to be W, a deflection quantity (how much deflection occurs in use) is taken as d, a spring length is taken as L, a spring width is taken as b, a spring thickness is taken as h and $$I = (b \times h \times h \times h)/12,$$

the external force (contacting force) W on the contacting portion 430 can be calculated in accordance with the following equation (1) (see the publications: "Mechanical Engineering Handbook" published by Sanseido, written by Akijiro Baba).

$$W = 48 \times E \times I \times d/(L \times L \times L) \quad (1)$$

In this case, for example, if the piece member 400 is made from a phosphor copper plate having a thickness of 0.4 mm, and when $$b = 0.003 (m) \quad (2)$$

$$d = 0.001 (m) \quad (3)$$

$$L = 0.008 (m) \quad (4)$$

$$h = 0.0004 (m) \quad (5),$$

from these equations (1) to (5), the contacting force W is as follows.

$$\text{Contacting Force } W = 48 \times E \times I \times d/(L \times L \times L)$$
$$= 65.4 \ (N) = 6.676 \ (kgf)$$

When a safety factor is taken to be 1/5, the contacting force W=1.334 kgf, and in this case, the catalog issued by Japan AMP says that, if tin plating (the contacting force is above 100 g) is done for a conductive metallic thin-film to be formed on the surfaces of the piece portion 410 and the leg portions 420, 420, the contact portion 430 can withstand the use under the condition of a voltage=30V and a current=10A, and does not require gold plating.

Furthermore, at given positions for the connection to the piece members 400, in the first connecting line 106 formed on the substrate member 105, that is, in the vicinity of an edge portion of the substrate member 105, a plurality of connecting holes 450 are made as a first connecting section at a predetermined interval along the edge portion of the substrate 105 and are also made at a predetermined interval (in four columns in FIGS. 4 and 5) along a direction perpendicular to the edge portion of the substrate member 105.

The inner wall portions of these connecting holes 450 are electrically connected to the first connecting line 106, and the leg portions 420, 420 of the piece member 400 are fitted in these connecting holes 450 so that the piece portion 410 is disposed to protrude in a direction perpendicular to the edge portion of the substrate member 105, which establishes an electric connection between the piece member 400 and the first connecting line 106.

Still further, as well as the power connecting part 102 shown in FIGS. 4 and 5, the ground connecting part 103 is made up of a plurality of piece members 400 (ground connecting piece members).

Besides, like the power connecting part 102, for constructing the ground connecting part 103, in the third connecting line 108 formed on the substrate member 105 and in the vicinity of the substrate member 105, a plurality of connecting holes 450 are made as a second connecting section at a predetermined interval along the edge portion of the substrate member 105 and are also made at a predetermined interval (in three rows in FIGS. 4 and 5) along a direction normal to the edge portion of the substrate member 105.

Likewise, the inner wall portions of these connecting holes 450 are electrically connected to the third connecting line 108, and the leg portions 420, 420 of the piece member 400 are put in the connecting holes 450 so that the piece portion 410 is located to project in a direction perpendicular to the edge portion of the substrate member 105, which sets up an electric connection between the piece member 400 and the third connecting line 108.

Figure 24A:
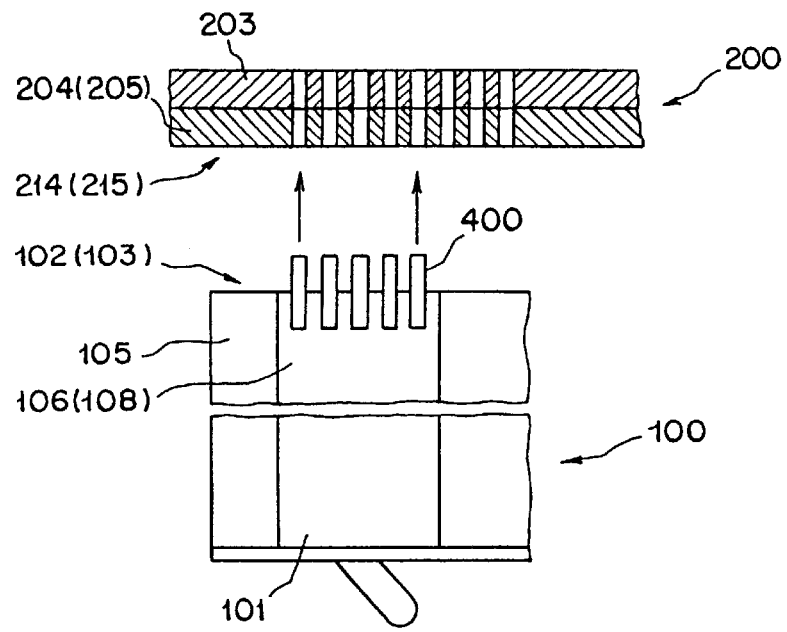
FIG. 24A is a top view partially showing a breaker unit with a small-capacity NFB.
Figure 24B:
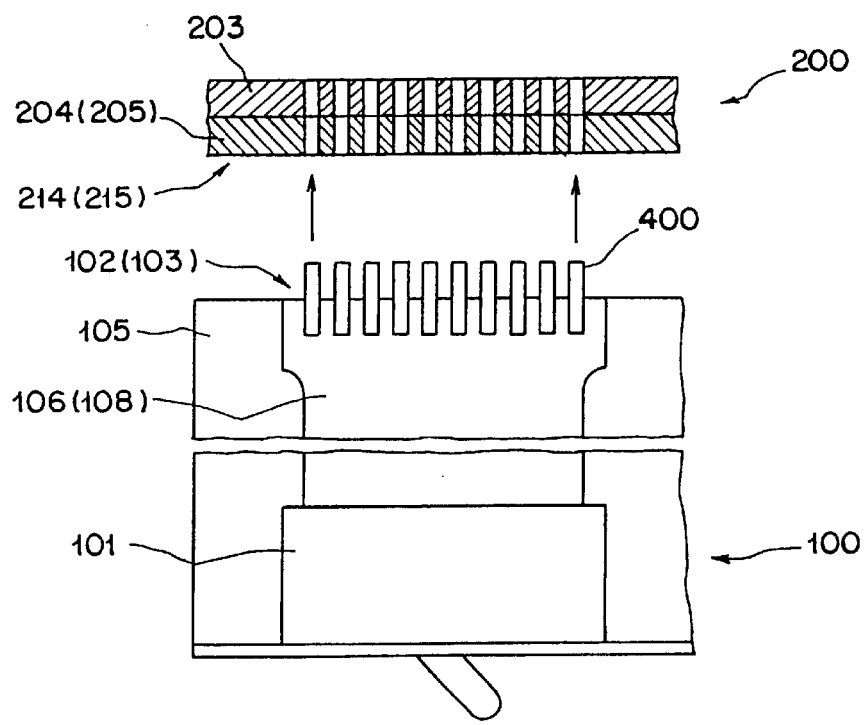
FIG. 24B is a top view partially showing a breaker unit with a large-capacity NFB.

FIGS. 24A and 24B are illustrations of the breaker unit 100 viewed from the top surface side, and FIG. 24A is a top view partially showing the breaker unit 100 equipped with a small-capacity NFB 101, while FIG. 24B is a top view partially showing the breaker unit 100 including a large-capacity NFB 101.

For the construction of the breaker unit 100, the numbers of the connecting holes 450 in the first connecting line 106 of the power connecting part 102 and the piece members 400 to be fitted in the connecting holes 450 in the third connecting line 108 of the ground connecting part 103 are made to be increased and decreased in accordance with the capacity of the NFB 101 as shown in FIGS. 24A and 24B, and when the NFB 101 has a small capacity (see FIG. 24A), a small number of (5 in FIG. 24A) piece members 400 are set in the connecting holes 450 of the first connecting line 106 and in the connecting holes 450 of the third connecting line 108, whereas, when the NFB 101 has a large capacity (see FIG. 24B), a large number of (10 in FIG. 24B) piece members 400 are fitted in the connecting holes 450 of the first connecting line 106 of the power connecting part 102 and in the connecting holes 450 of the third connecting line 108 of the ground connecting part 103.

Furthermore, as shown in FIG. 7, a wire 109 such as a lead wire is stretched between the NFB 101 and the first connecting line 106, while a wire 110 such as a lead wire is put between the NFB 101 and the second connecting line 107, so that the NFB 101 is electrically connected to both the first connecting line 106 and second connecting line 107.

As shown in FIG. 1, the first connector part 104 is fixedly placed in the vicinity of the breaker unit mounting board 200 side end portion of the substrate member 105 to protrude therefrom, and both the second connecting line 107 and third connecting line 108 are connected to the first connector part 104. Further, the first connector part 104 is made to allow a connection with a second connector part 301, and the connection between the first connector part 104 and the second connector part 301 enables the second connecting line 107 to be connected through the first and second connector parts 104 and 301 to power lines (not shown) of various types of rack units 800, and further, enables the third connecting line 108 to be connected therethrough to ground lines of the various types of rack units 800.

That is, the first connector part (unit connecting part) 104 functions as a first unit connecting part to supply power through the NFB 101 to the unit side, and also functions as a second unit connecting part to make a connection between the unit side and the ground line through the ground connecting part.

In the breaker unit mounting board 200, as shown in FIG. 1, power conductive plate members (first conductive plate members) 204, CG conductive plate members (second conductive plate members) 205 and insulating materials 206 are attached onto one (front side) surface of an insulating plate member 203 in the form of a plurality of sets (2 in FIG. 1), while power line connecting parts 220 are installed onto the other surface of the insulating plate member 203 at positions corresponding to the rear sides of the power conductive plate members 204, and CG ground line connecting parts 230 are fitted thereonto at positions corresponding to the rear sides of the CG conductive plate members 205.

Both the power conductive plate members 204 and CG conductive plate members 205 are made of an electric conductive material such as a copper and have a rectangular configuration, and each of the power conductive plate members 204 and each of the CG conductive plate members 205 are mounted on the one surface of the insulating plate member 203 in an adjacent relation in a state where their longitudinal directions assume vertical directions and the insulating material 206 is interposed therebetween.

In each of the power conductive plate members 204, a plurality of (3 in FIG. 1) engaging hole portions (mating power connecting part) 214 are made at adjacent positions of the identical height at a predetermined interval, and further, a plurality of (3 in FIG. 1) engaging hole portions 214 identical to the aforesaid engaging hole portions 214 are made along a vertical direction of the power conductive plate member 204 at an equal interval. The piece members 400 of the power connecting part 102 are made to be detachably set in these engaging hole portions 214.

Whereupon, in mounting the breaker unit 100, in a manner that the piece members 400 of the power connecting part 102 are fitted in the engaging hole portions 214 of the breaker unit mounting board 200, the power conductive plate member 204 and the first connecting line 106 are electrically connected to each other.

In addition, also in the CG conductive plate member 205, as well as the power conductive plate member 204, a plurality of (3 in FIG. 1) engaging hole portions 215 (mating ground connecting part) are made at adjacent positions of the identical height at a predetermined interval, and further, a plurality of (3 in FIG. 1) engaging hole portions 215 identical to the aforesaid engaging hole portions 215 are made along a vertical direction of the CG conductive plate member 205 at an equal interval. The piece members 400 of the ground connecting part 103 are made to be detachably set in these engaging hole portions 215.

Thus, in mounting the breaker unit 100 in the breaker unit mounting board 200, in a manner that the piece members 400 of the ground connecting part 103 are fitted in the engaging hole portions 215, the CG conductive plate member 205 and the third connecting line 108 are electrically connected to each other.

Moreover, connector through-holes 207 are respectively made in the insulating plate member 203 at positions adjacent to the CG conductive plate member 205 and identical in height to the engaging hole portions 215, and when one breaker unit 100 is mounted on the breaker unit mounting board 200, the first connector part 104 is fitted in one of the connector through-holes 207.

Figure 8:
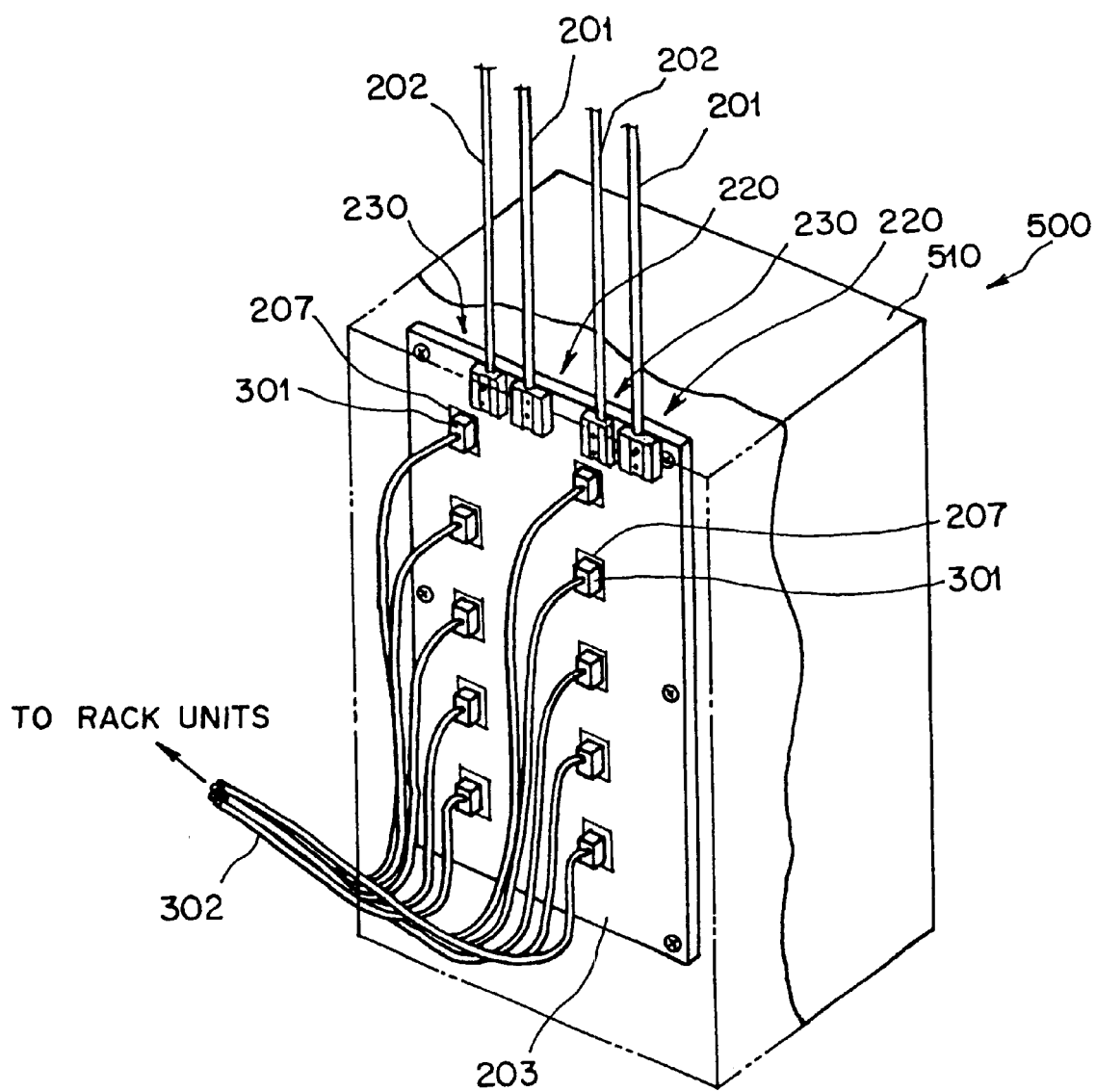
FIG. 8 is a view illustratively showing a rear surface side construction of a power distributing apparatus.
Figure 9:
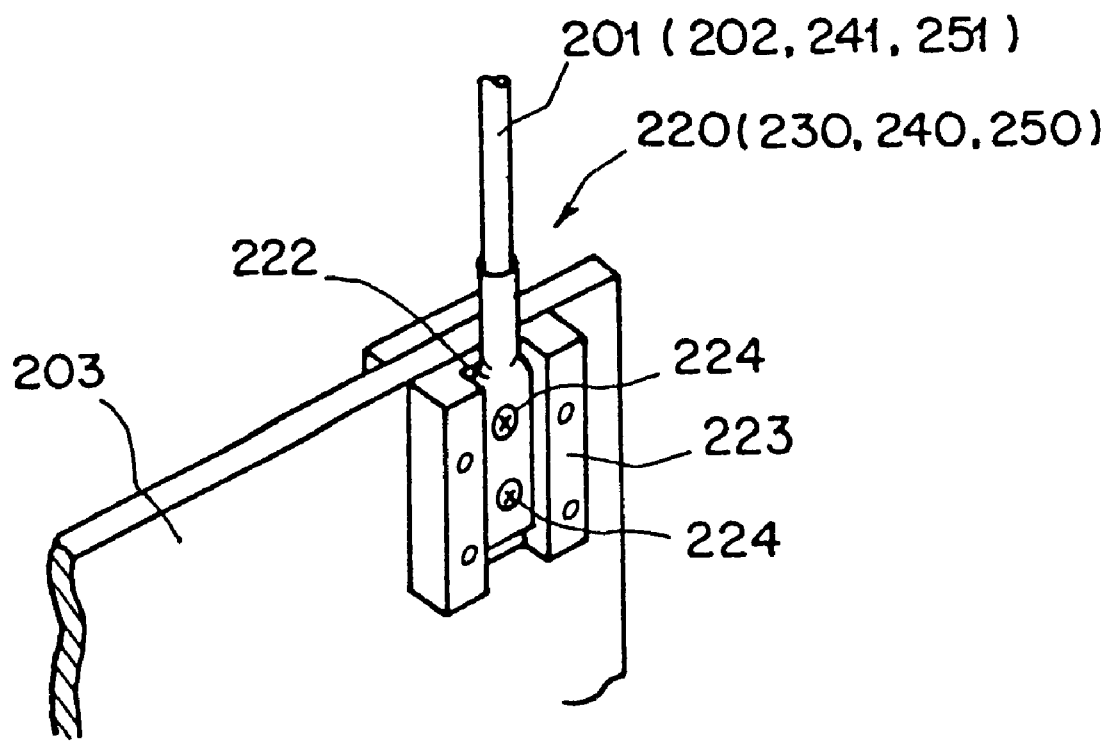
FIG. 9 is an illustration of the breaker apparatus indicated by an arrow B in FIG. 1.
Figure 10:
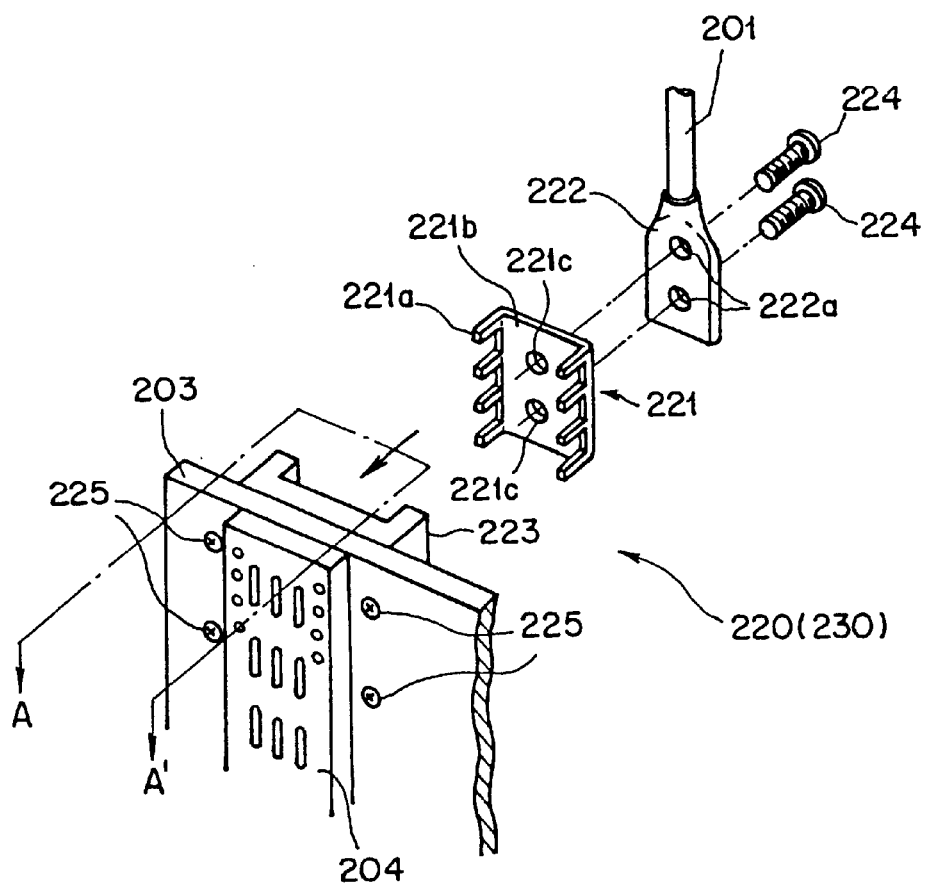
FIG. 10 is an exploded perspective view illustratively showing a construction of a power line connecting part.
Figure 11:
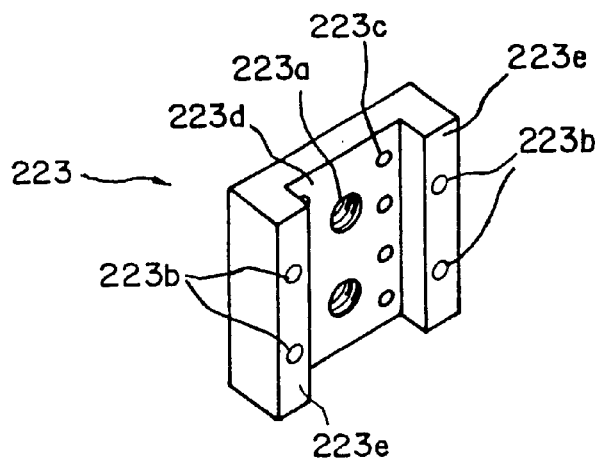
FIG. 11 is a perspective view illustratively showing a structure of a holder.
Figure 12:
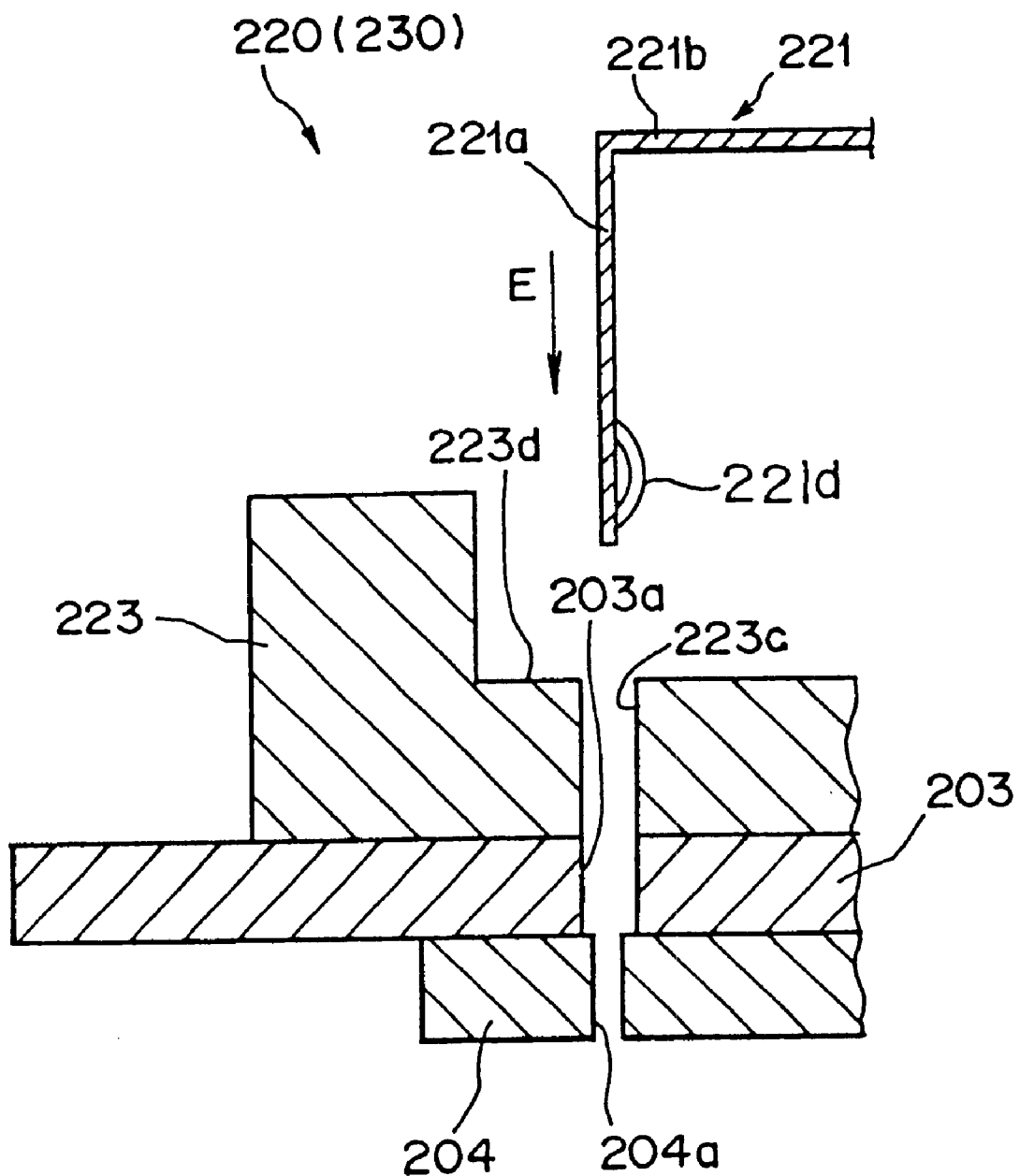
FIG. 12 is a cross-sectional view taken along a line A—A' of FIG. 10.

FIG. 8 is a view illustratively showing a rear surface side construction of a power distributing apparatus, FIG. 9 is an illustration of a portion of the breaker apparatus indicated by an arrow B in FIG. 1, FIG. 10 is an exploded perspective view illustratively showing a construction of a power line connecting part, FIG. 11 is a perspective view illustratively showing a construction of a holder 233, and FIG. 12 is a cross-sectional view taken along a line A—A' of FIG. 10.

As shown in FIG. 8, at a rear surface side (the front side of paper in FIG. 8) position of a housing 510 of the power distributing apparatus 500, the breaker unit mounting board 200 is set so that its surface carrying the power conductive plate members 204, the CG conductive plate members 205 and others faces the front side of the power distributing apparatus 500.

Furthermore, as shown in FIG. 8, on the rear side surface of the breaker unit mounting board 200, the power lines (power supply lines) 201 are attached through the power line connecting parts 220 to the insulating plate member 203, while the CG ground lines (ground lines) 202 are fitted through the CG ground line connecting parts 230 to the insulating plate member 203.

Still further, the second connector parts 301 are respectively fitted in the connector through-holes 207 in the insulating plate member 203 from the rear surface side of the breaker unit mounting board 200.

More specifically, in each of the connector through-holes 207, the first connector part 104 and the second connector part 301 are coupled to each other, and each of the connector through-holes 207 serves as a first connection mediating part for the connection between the power supply line to the unit side and the first connector part 104, and further, acts as a second connection mediating part for the connection between the ground line to the unit side and the second connector part 301.

Each of the power line connecting parts 220 is, as shown in FIGS. 9 and 10, composed of a connection fitting 221, a connection terminal 222, a holder 223 and fitting screws 224.

The connection terminal 222 is a plate-like member made of an electric conductive metal or the like, and has a plurality of (2 in FIG. 10) fitting hole portions 222a arranged at a given interval, and further, is fitted to a tip portion of the power line 201.

The connection fitting 221 is also made of an electric conductive metal or the like, and as shown in FIG. 10, has a plurality of (2 in FIG. 10) hole portions 221c arranged at a given interval corresponding to the hole portions 222a of the connection terminal 222 in its plate-like member 221b, and a plurality of (4 at each side in FIG. 10) connection legs 221a are provided to protrude in the same direction from a pair of side surface positions of the plate-like member 221b formed in parallel with the hole portions 221c.

In addition, as shown in FIG. 12, a connection projection 221d is formed at a tip portion of each of the connection legs 221a of the connection fitting 221. The connection projection 221d of the connection leg 221a is positioned to be separated by a plate thickness at a groove portion 223d of the holder 223 plus the thickness of the insulating plate member 203 from the junction between the connection leg 221a and the plate-like member 221b.

As shown in FIGS. 10 and 11, the holder 223 is a plate-like member having, at its central portion, a groove portion 223d of a width somewhat larger than the width of the connection terminal 222, which is made of a resin or the like. In addition, in the holder 223, a plurality of (4 in FIGS. 9 and 10) fitting holes 223b are bored in both side portions 223e, 223e of the groove portion 223d, and the holder 223 is fixedly secured to the insulating plate member 203 at a position opposite to the power conductive plate member 204 in a state where the groove portion 223d faces the rear side of the insulating plate member 203 in a manner that screws 225 are inserted into the fitting holes 223b and driven into the insulating plate member 203.

Furthermore, in the holder 223, a plurality of (2 in FIGS. 9 to 11) tap holes 223a are bored in the vicinity of a central portion of the groove portion 223d at a given interval corresponding to that of the hole portions 222a of the connection terminal 222.

Still further, in the holder 223, a plurality of (4 in FIG. 11) through-holes 223c are bored in both side portions of the tap holes 223a in the groove portion 223d at a required interval, and the connection legs 221a of the connecting fitting 221 are fitted in these through-holes 223c, respectively.

Moreover, as shown in FIG. 12, the insulating plate member 203 has through-holes 203a made at positions aligned with the corresponding through-holes 223c of the holder 223, and the power conductive plate member 204 has through-holes 204a made at positions aligned with the corresponding through-holes 223c of the holder 223.

In this construction, for the connection between the power conductive plate member 204 and the power line 201, in the power line connecting part 220, the connection fitting 221 is initially set in a manner that the connection legs 221a are inserted into the corresponding through-holes 223c, through-holes 203a and through-holes 204a. At this time, the connection projection 221d formed on the tip portion of each of the connection legs 221a of the connection fitting 221 is brought into contact with the inner wall portion of the through-hole 204a, thereby establishing an electrical connection between the power conductive plate member 204 and the connection fitting 221.

Subsequently, as shown in FIG. 10, the connection terminal 222 is located on a surface of the connection fitting 221 opposite to the surface thereof contacting with the holder 223 so that its fitting holes 222a are aligned with the hole portions 221c of the connection fitting 221, and then, the fitting screws 224 are inserted into the fitting holes 222a and the hole portions 221c and engaged with the tap holes 223a made in the holder 223, thus establishing an electrical connection between the connection terminal 222 and the connection fitting 221 and, hence, setting up an electrical connection between the power conductive plate member 204 and the power line 201 through the connection terminal 222 and the connection fitting 221.

Furthermore, as well as the above-mentioned power line connecting part 220, each of the CG ground line connecting parts 230 is also composed of a connection fitting 221, a connection terminal 222, a holder 223 and fitting screws 224, and this CG ground line connecting part 230 makes an electrical connection between the CG ground line 202 and the CG conductive plate member 205.

The second connector part 301 is of a type connectable to the first connector part 104, and as shown in FIG. 1, the power supply line to the rack unit 800 side and the CG ground line 202 are mounted on the second connector part 301 as an output cable 302.

Referring to illustrations, a description will be made hereinbelow of a state in which the above-described breaker unit 100 is mounted in a power distributing apparatus.

Figure 13:
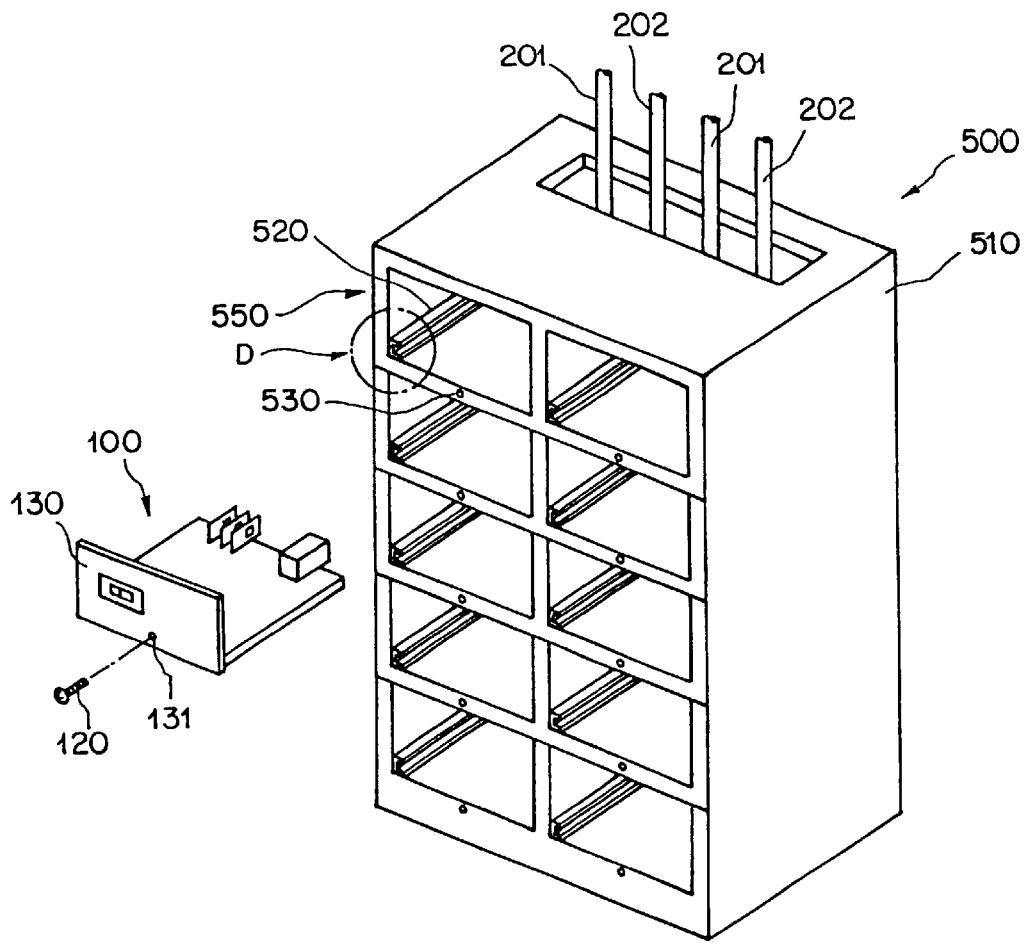
FIG. 13 is an exploded perspective view illustratively showing a mounting condition of the breaker unit according to the first embodiment of this invention onto a power distributing apparatus.
Figure 14:
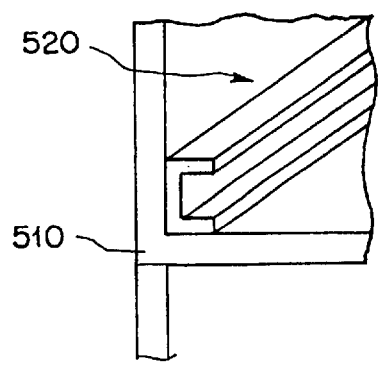
FIG. 14 is an enlarged illustration of a portion indicated by an arrow D in FIG. 13.
Figure 15:
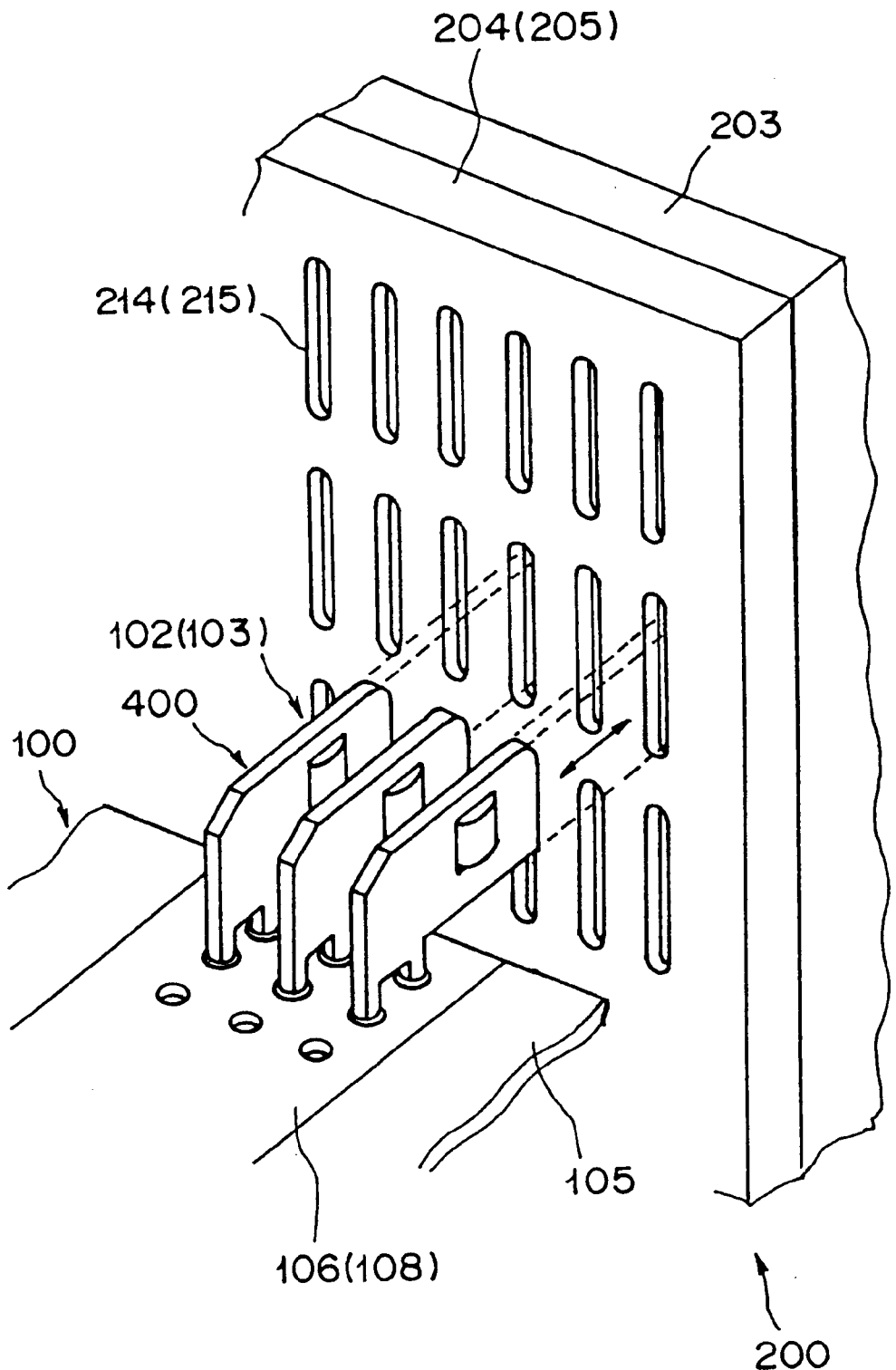
FIG. 15 is a partially broken perspective view showing a mounting condition of the breaker unit according to this embodiment onto a breaker unit mounting board.

FIG. 13 is an exploded perspective view illustratively a state where the breaker unit according to the first embodiment of this invention is mounted in a power distributing apparatus, FIG. 14 is an enlarged view showing a portion indicated by an arrow D in FIG. 13, and FIG. 15 is a partially broken perspective view showing a state where the breaker unit according to the first embodiment of this invention.

As shown in FIG. 8, the breaker unit mounting board 200 is disposed at the rear surface side position of the power distributing apparatus 500, and as shown in FIG. 13, a plurality of (10 in FIG. 13) breaker unit mounting slots 550 are made in the power distributing apparatus 500, and further, the engaging hole portions 214 of the power conductive plate member 204, the engaging hole portions 215 of the CG conductive plate member 205 and the connector through-hole 207 are placed as a set at the innermost side position of each of the breaker unit mounting slots 550 to be adjacent to each other at the identical height.

In addition, in each of the breaker unit mounting slots 550, rails 520 each having a U-shaped cross section are fixedly laid at positions of a given height (lower end portions in FIGS. 13 and 14) on both side surfaces to be perpendicular to the breaker unit mounting board 200 so that their opening portions open inwardly and face each other, and the substrate member 105 of each of the breaker units 100 is fitted in the facing opening portions of the rails 520 so that the breaker unit 100 is inserted into the corresponding breaker unit mounting slot 550 while being guided by the rails 520.

Furthermore, in the housing 510, a screw hole 530 is made at a position which is a lower position of each of the breaker unit mounting slots 550 and a central position of the breaker unit mounting slot 550 in its horizontal direction, and when the breaker unit 100 is inserted into the breaker unit mounting slot 550, a fitting hole 131 made in the panel 130 of the breaker unit 100 is aligned with the screw hole 530 of the housing 510, and further, a fitting screw 120 is inserted into the fitting hole 131 and engaged with the screw hole 530 so that the breaker unit 100 is fixedly secured to the housing 510.

That is, in the case of the breaker apparatus according to the first embodiment, in the power distributing apparatus 500, the breaker units 100 equipped with the NFB 101 having a power capacity of a predetermined minimum unit are mounted/detached by a needed number on/from the breaker unit mounting board 200 in accordance with the power capacity required as a communication system, thereby constituting a power distributing apparatus with a desired power capacity.

In the first embodiment of this invention, since the breaker apparatus and the breaker unit are constructed as described above, in mounting each of the breaker units 100 on the power distributing apparatus 500, the substrate member 105 of the breaker unit 100 is inserted into the corresponding one of the plurality of (10 in FIG. 13) breaker unit mounting slots 550 formed in the power distributing apparatus 500 while being guided by the rails 520, and as shown in FIG. 15, at the innermost end portion of the breaker unit mounting slot 550, the piece members 400 of the power connecting part 102 are fitted in the engaging hole portions 214 bored in the power conductive plate member 204 of the breaker unit mounting board 200.

Furthermore, at the same time, as well as the above-mentioned power connecting part 103, at the innermost end portion of the breaker unit mounting slot 550, the piece members 400 of the ground connecting part 103 are put in the engaging hole portions 215 of the CG conductive plate member 205 of the breaker unit mounting board 200, and further, the first connector part 104 is inserted into the connector through-hole 207.

Whereupon, the power connecting part 102 makes an electrical connection between the NFB 101 and the power line 201 and further, causes an electrical connection between the ground connecting part 103 and the ground line 202.

Still further, the fitting screw 120 is inserted into the fitting hole 131 made in the panel 130 of the breaker unit 100 to be engaged with the screw hole 530 made in the housing 510, so that the breaker unit 100 is fixedly secured to the power distributing apparatus 500.

Moreover, the first connector part 104 is connected through the connector through-hole 207 to the second connector part 301, and hence, the ground connecting part 103 is connected through the third connecting line 108, the first connector part 104 and the second connector part 301 to a unit side ground line, whereupon the unit side ground line is electrically connected to the CG ground line 202. At the same time, the NFB 101 is connected through the second connecting line 107, the first connector part 104 and the second connector part 301 to a unit side power supply line, so that the power is supplied through the NFB 101 to the unit side power supply line.

On the other hand, when the breaker unit 100 is detached from the power distributing apparatus 500, the above-described processing is reversed.

As described above, according to the first embodiment of this invention, each of the breaker units is constructed with the NFB 101 having a power capacity of a predetermined minimum unit, and the breaker units 100 each thus constructed are attached/detached to/from the breaker unit mounting board 200 to constitute the power distributing apparatus 500, and therefore, a power distributing apparatus 500 having a necessary but minimized power capacity is producible. Accordingly, it is possible to manufacture the power distributing apparatus 500 at a minimum cost and further to reduce the system manufacturing cost. In addition, particularly, in constructing a small station system, the useless initial investment is held down and the rate of the power distributing apparatus cost to the total manufacturing cost is cut down.

Moreover, when the breaker unit 100 is mounted on the breaker mounting board 200, the piece members 400 of the power connecting part 102 are fitted in the engaging hole portions 214 made in the power conductive plate member 204 of the breaker unit mounting board 200 to establish the connection, and the piece members 400 of the ground connecting part 103 are put in the engaging hole portions 215 made in the CG conductive plate member 205 to set up the connection. On the other hand, when the breaker unit 100 is detached from the breaker unit mounting board 200, the piece members 400 of the power connecting part 102 are pulled out from the engaging hole portions 214 to make the disconnection, and the piece members 400 of the ground connecting part 103 are extracted from the engaging hole portions 215 to make the disconnection. Thus, at the attachment/detachment of the NFB 101 to/from the power distributing apparatus 500, the need for a driver and others is eliminable, and the replacement of the NFB 101 at the system maintenance, the enlargement of the NFB 101 and other operations are facilitated to enhance the working efficiency.

Furthermore, the breaker unit 100 is provided with the NFB 101 and can be inserted and pulled out into/from the breaker unit mounting slot 550 of the power distributing apparatus 500 while being guided by the rails 520 so that the breaker unit 100 is attached/detached to/from the breaker unit mounting board 200 at the innermost end portion of the breaker unit mounting slot 550. Therefore, it is possible to mount/detach the NFB 101 on/from the power distributing apparatus 500 in the hot-line condition, and at this time, to replace the NFB 101 in a manner that the operator or the like does not directly touch the vicinity of the terminals, which makes easy the handling of the NFB 101 at the extension of the rack units or the maintenance and further makes sure the safety at the handling.

Still further, since the number of the piece members 400 to be fitted in the connecting holes 450 of the ground connecting part 103 or the first connecting line 106 can be increased and decreased in accordance with the capacity of the NFB 101, it is possible to construct the breaker unit 100 at the minimum cost and further to reduce the manufacturing cost. In addition, for example, in the case that the power capacity of the power distributing apparatus 500 increases with the extension of the various types of rack units in the rack equipment or the like so that a large amount of current flows in the interior of the power distributing apparatus 500, the extension of the piece members 400 takes place to lower the electric resistance, thus improving the system safety.

(B) Description of a Second Embodiment of this Invention

Figure 16:
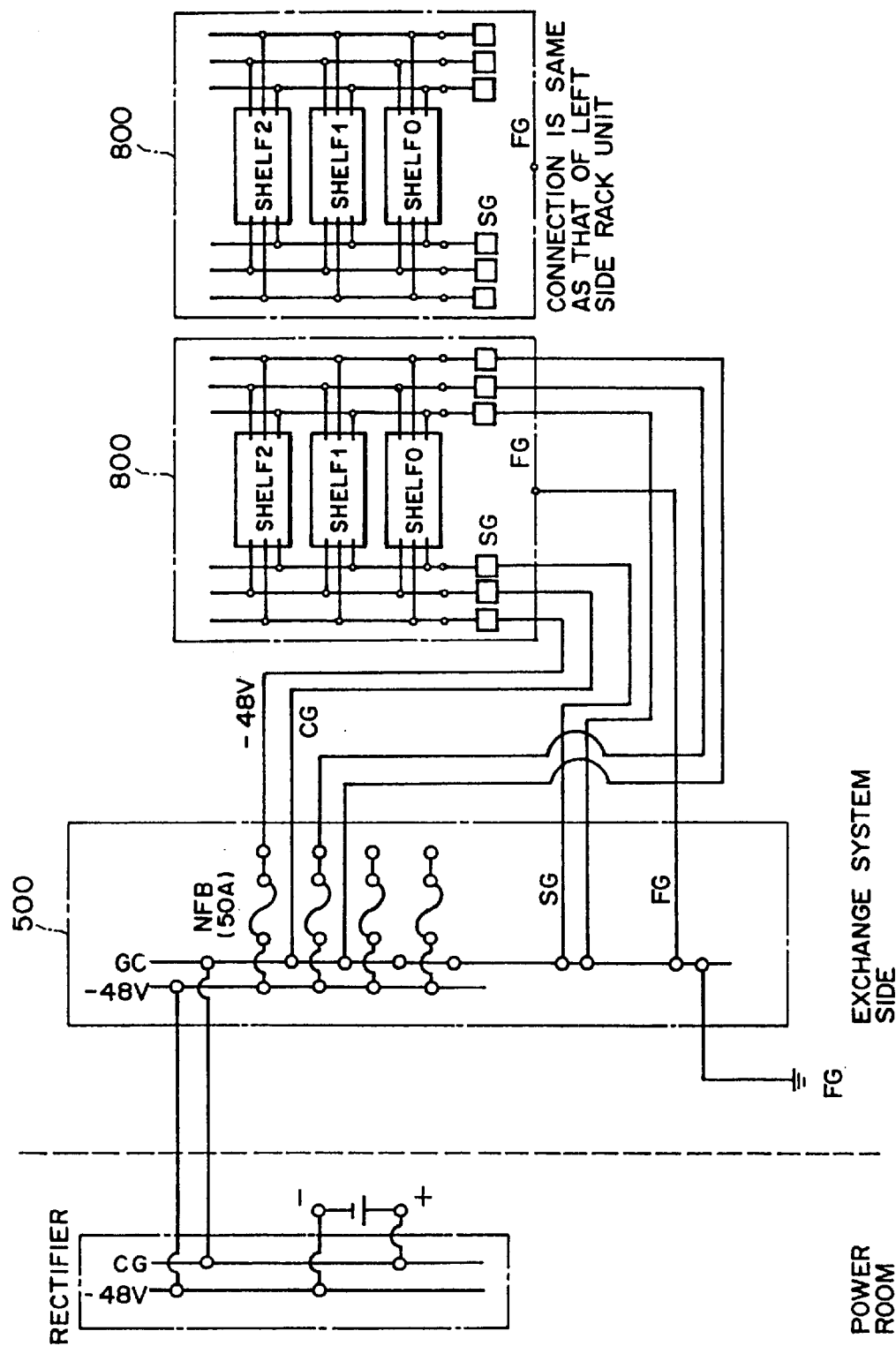
FIG. 16 is a figure illustratively showing an arrangement of an integrated ground system.
Figure 17:
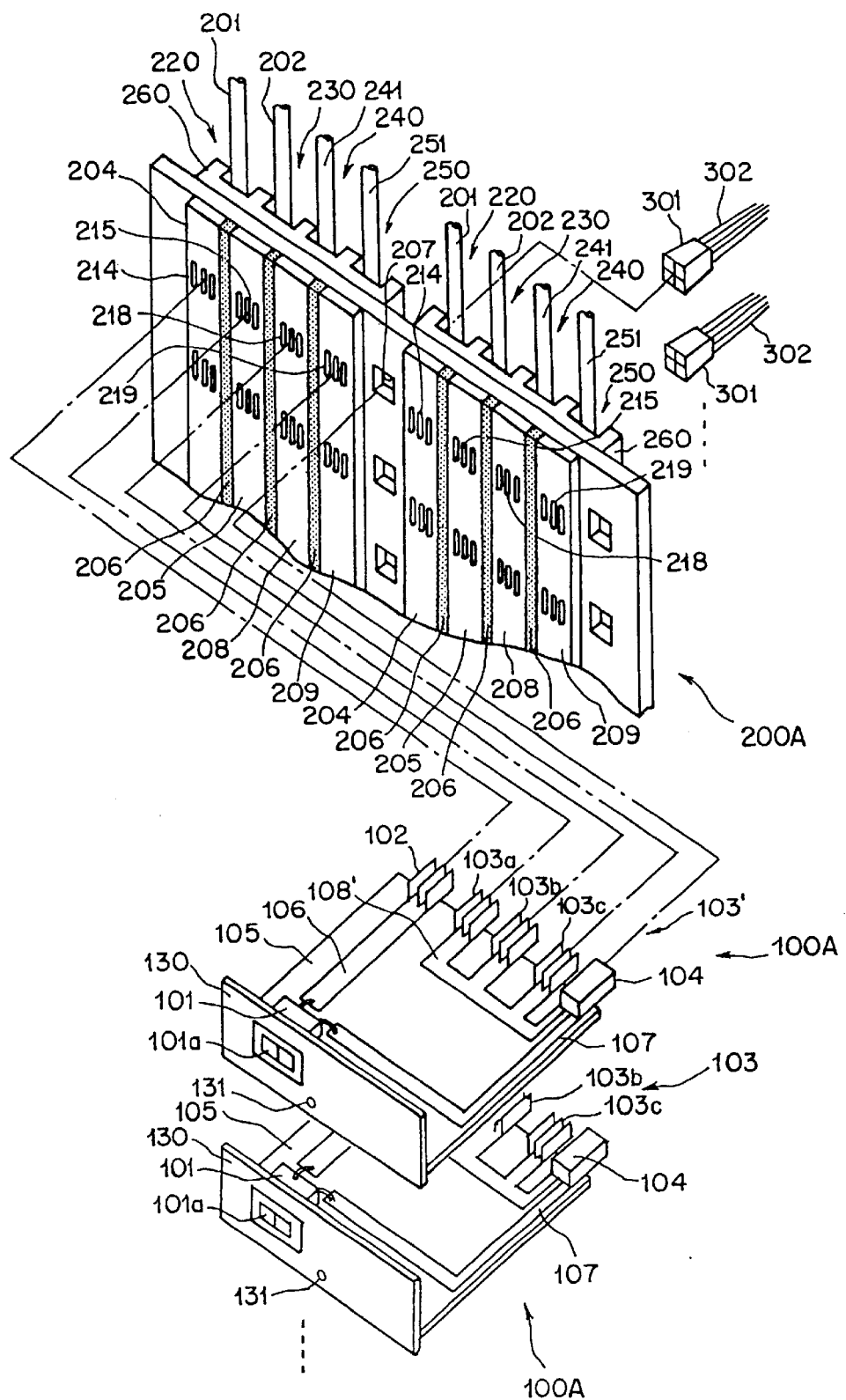
FIG. 17 is a perspective view illustratively showing a construction of a breaker apparatus according to a second embodiment of this invention.

FIGS. 16 and 17 are illustrations of a breaker apparatus according to a second embodiment of this invention, and more specifically, FIG. 16 illustratively shows a construction of an integrated ground system while FIG. 17 is a perspective view illustratively showing a construction of the breaker apparatus according to the second embodiment of this invention.

The breaker apparatus according to the second embodiment, shown in FIG. 17, is also used for a power distributing apparatus in one terminal station of the communication system shown in FIG. 2, and is made to distribute power, fed through power supply lines (power lines) 201, to various types of units (rack units) 800 placed in rack columns, and further, to prevent the supply of an excessive current exceeding the tolerances of the rack units 800 thereto, and organizes an isolated ground system as shown in FIG. 16.

The breaker apparatus according to the second embodiment is, as shown in FIG. 17, equipped with breaker units 100A and a breaker unit mounting board 200A.

Each of the breaker units 100A includes a ground connecting part 103' in place of the ground connecting part 103 of the breaker unit 100 according to the first embodiment. Incidentally, in the illustration, the same numerals as the above-mentioned numerals designate the same or substantially identical parts or portions, respectively, and the description thereof will be omitted for brevity.

The ground connecting part 103' is, as shown in FIG. 17, provided with a CG ground connecting section 103a, an SG ground connecting section 103b and an FG ground connecting section 103c. The CG ground connecting section 103a, the SG ground connecting section 103b, the FG ground connecting section 103c and a first connector part 104 are electrically connected to each other through a third connecting line 108' being an electric conductive pattern formed on a substrate member 105.

In each of the CG ground connecting section 103a, the SG ground connecting section 103b and the FG ground connecting section 103c, a plurality of (holes forming four rows if using the same as shown in FIGS. 4 and 5) connecting holes 450 are made in the third connecting line 108' on the substrate member 105 as a second connecting part at a given interval along an edge portion of the substrate member 105 and in the vicinity of the edge portion of the substrate member 105, with the identical connecting holes 450 being also made at a given interval along a direction perpendicular to the edge portion of the substrate member 105. Leg portions 420 of each of the piece members 400 are fitted in these connecting holes 450.

The breaker unit mounting board 200A includes SG conductive plate members 208 and FG conductive plate members 209 in addition to the components of the breaker unit mounting board 200 in the first embodiment, and insulating materials 206 is placed between each of the CG conductive plate members 205 and each of the SG conductive plate members 208 and further between each of the SG conductive plate members 208 and each of the FG conductive plate members 209.

More specifically, in the breaker unit mounting board 200A, as shown in FIG. 17, the power conductive plate members 204, the CG conductive plate members 205, the SG conductive plate members 208, the FG conductive plate member 209 and the insulating materials 206 are installed on one (front side) surface of the insulating plate member 203 in the form of a plurality of sets (2 in FIG. 17).

Furthermore, each of the SG conductive plate members 208 and each of the FG conductive plate members 209 have the same construction as that of the CG conductive plate members 205, and respectively have engaging hole portions 218 and 219 made at the identical height to be adjacent to the engaging hole portions 215 of each of the CG conductive plate members 205.

In addition, on the other (rear side) surface of the insulating plate member 203, power line connecting parts 220, CG ground line connecting parts 230, SG ground line connecting parts 240 and FG ground line connecting parts 250 are placed at the positions corresponding to the power conductive plate members 204, the positions corresponding to the CG conductive plate members 205, the positions corresponding to the SG conductive plate members 208 and the positions corresponding to the FG conductive plate members 209, respectively.

Besides, each of the SG ground line connecting parts 240 and each of the FG ground line connecting parts 250 have the same construction as that of the CG ground line connecting parts 230 in the first embodiment shown in FIG. 9, and the installation of the SG ground line connecting parts 240 and the FG ground line connecting parts 250 establishes an electrical connection of the SG conductive plate members 208 to SG ground lines 241 and, further, an electrical connection of the FG conductive plate members 209 to FG ground lines 251.

Still further, when the breaker unit 100A is mounted on the breaker unit mounting board 200A, the piece members 400 of the CG ground connecting section 103a, the piece members 400 of the SG ground connecting section 103b and the piece members 400 of the FG ground connecting section 103c are fitted in the aforesaid engaging hole portions 215, the engaging hole portions 218 and the engaging hole portions 219, respectively, whereupon the CG conductive plate member 205, the SG conductive plate member 208 and the FG conductive plate member 209 are electrically connected to the third connecting line 108'.

In other words, also in the case of the breaker apparatus according to the second embodiment, in the power distributing apparatus 500, in a manner that the breaker units 100A each including the NFB 101 having a power capacity of a predetermined minimum unit are attached/detached by a needed number to/from the breaker unit mounting board 200A in accordance with the power capacity required for a communication system, thus constructing a power distributing apparatus 500 with a desired power capacity.

Since the breaker apparatus and breaker unit according to the second embodiment of this invention are constructed as described above, when the breaker units 100A are mounted in the power distributing apparatus 500, the substrate member 105 of each of the breaker units 100A is inserted into the corresponding one of a plurality of (10 if using the same as shown in FIG. 13) breaker unit mounting slots 550 of the power distributing apparatus 500 while being guided by rails 520 laid therein, and at the innermost end portion of the breaker unit mounting slot 550, the piece members 400 of the power connecting part 102, the piece members 400 of the CG ground connecting section 103a and the piece members 400 of the SG ground connecting section 103b are fitted in the engaging hole portions 214 of the power conductive plate member 204 of the breaker unit mounting board 200A, the engaging hole portions 215 of the CG conductive plate member 205 and the engaging hole portions 218 of the SG conductive plate member 208, respectively, besides the first connector part 104 is inserted into the connector through-hole 207.

Whereupon, the power connecting part 102 makes an electrical connection of the NFB 101 to the power line 201, and the first connector part 104 supplies power through the NFB 101 to the unit side, and further, the ground connecting part 103 is electrically connected to the CG ground line 202.

Moreover, a fitting screw 120 is inserted into a fitting hole 131 made in a panel 130 of the breaker unit 100A and engaged with a screw hole 530 made in a housing 510 of the power distributing apparatus 500 so that the breaker unit 100A is fixedly secured to the power distributing apparatus 500.

Furthermore, by the connection of the first connector part 104 through the connector through-hole 207 to the second connector part 301, the ground connecting part 103' is connected through the third connecting line 108', the first connector part 104 and the second connector part 301 to the unit side grounding line, so that the unit side CG, SG and FG ground lines are electrically connected to the CG ground line 202, the SG ground line 241 and the FG ground line 251, respectively. In addition, concurrently, the NFB 101 is connected through the second connecting line 107, the first connector part 104 and the second connector part 301 to the power supply line to the unit side, with the result that the power is supplied through the NFB 101 to the power supply line to the unit side.

Besides, when the breaker units 100A are removed from the power distributing apparatus 500, the reverse processing takes place.

As described above, with the breaker apparatus according to the second embodiment of this invention, even in the case of constructing an integrated ground system, the same effects as those of the above-described first embodiment are obtainable.

Incidentally, it is also appropriate that the breaker units 100 according to the first embodiment is mounted on the breaker unit mounting board 200A in the second embodiment. In this case, the breaker unit mounting board 200A can be used in common between the isolated ground system and the integrated ground system, which contributes to a lower manufacturing cost.

In case where the breaker unit mounting board 200A is applied to a power distributing apparatus 500 in a communication system based upon an isolated ground system, there is no need to form the SG conductive plate members 208, the FG conductive plate members 209, the SG ground line connecting parts 240, the FG ground line connecting parts 250, the SG ground lines 241 and the FG ground lines 251 on the insulating plate member 203, whereupon the manufacturing cost is reducible.

In the above-described embodiment, although the third connecting line 108' is constructed as an electric conductive pattern which electrically connects the CG ground connecting section 103a, the SG ground connecting section 103b, the FG ground connecting section 103c and the first connector part 104 on the substrate member 105, it should be understood that the present invention is not limited to this, and that it is intended to cover all changes and modifications of the embodiment herein which do not constitute departures from the spirit and scope of the invention.

Figure 18:
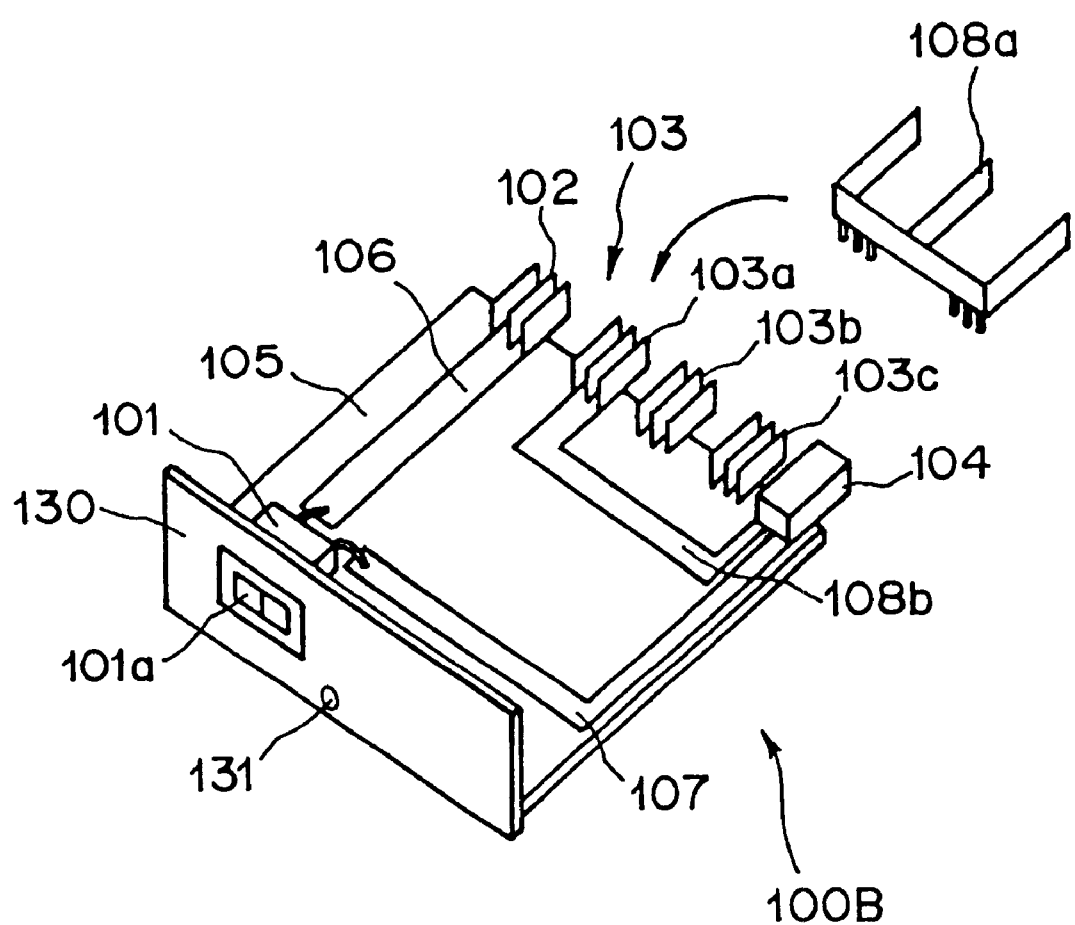
FIG. 18 is an illustration of a modification of a third connecting line.
Figure 19:
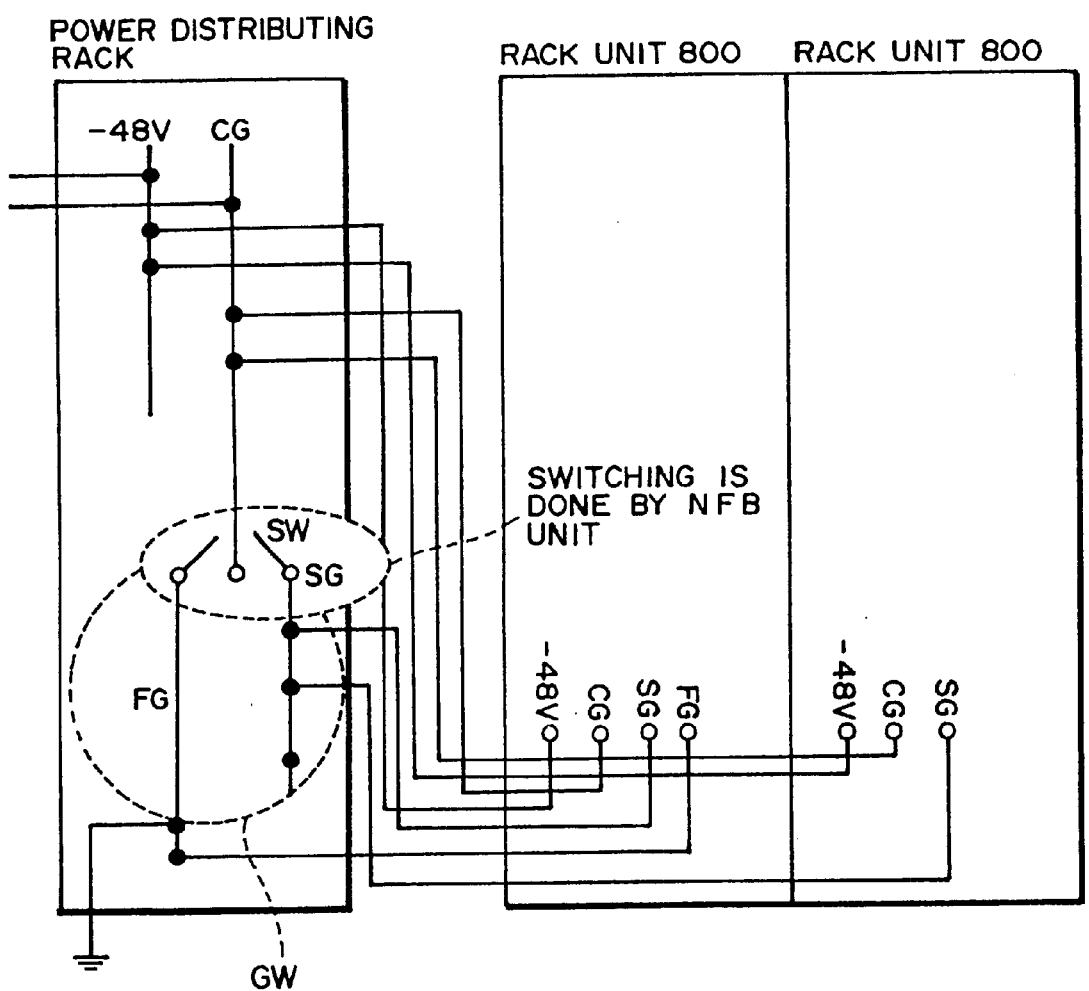
FIG. 19 shows a condition in which a ground system is switched within a power distributing apparatus.

For instance, FIG. 18 is an illustration of a modification of the third connecting line, and FIG. 19 is an illustration of a state of the switching of the ground system in a power distributing apparatus. It is also appropriate that, as shown in FIG. 18, in a breaker unit 100B to be mounted on the breaker unit mounting board 200A in the power distributing apparatus 500, a third connecting line 108b (ground fixed connection portion) being an electric conductive pattern for making an electrical connection between a first connector part 104 and a CG ground connecting section 103a is formed on a substrate member 105, and electric conductive pattern portions made of a conductive metal or the like are formed in the vicinity of a coupling portion of the SG ground connecting section 103b to the piece members 400 and in the vicinity of a coupling portion of the FG ground connecting section 103c to the piece members 400 on the substrate member 105, and further, a connection fitting 108a (connecting switch portion) is disposed to make a communicative connection among the third connecting line 108b, the vicinity of the coupling portion of the SG ground connecting section 103b to the piece members 400 and the vicinity of the coupling portion of the FG ground connecting section 103c to the piece members 400 for establishing an electrical connection among the CG ground connecting section 103a, the SG ground connecting section 103b, the FG ground connecting section 103c and the first connector part 104.

With this construction, when the power distributing apparatus 500 is used for the integrated ground system, in the breaker unit 100B, the connection fitting 108a is placed to make a communicative connection among the third connecting line 108b, the vicinity of the coupling portion of the SG ground connecting section 103b to the piece members 400 and the vicinity of the coupling portion of the FG ground connecting section 103c to the piece members 400. Whereas, when the power distributing apparatus 500 is used as the isolated ground system, in the breaker unit 100B, the connecting fitting 108a is only removed from the third connecting line 108b. Accordingly, the selective switching between the integrated ground system and the isolated ground system using a change-over switch as shown in FIG. 19 is achievable in a way that the breaker unit 100B is used in common, which accomplishes the reduction of the manufacturing cost.

Furthermore, for the ground system change between the isolated ground system and the integrated ground system, when the piece members 400 in both the SG ground connecting section 103b and FG ground connecting section 103c are take out from the breaker unit 100A according to the second embodiment, the electrical connection among the third connecting line 108b, the SG conductive plate member 208 and the FG conductive plate member 209 come to an end, with the result that it is possible to easily perform the ground system change from the integrated ground system to the isolated ground system.

Incidentally, in the above-described embodiments, although the switching between the isolated ground system and the integrated ground system depends upon the replacement of the breaker unit 100 (100A) or the attachment/detachment of the connection fitting 108a in the breaker unit 100A, this invention is not limited to this, but it is also possible to conduct the switching between the isolated ground system and the integrated ground system in a manner that a change-over switch, a jumper line, a dip switch or the like are placed on the breaker unit 100A. In this case, it is possible to easily accomplish the switching between the isolated ground system and the integrated ground system, and to enhance the working efficiency in the change of the ground system, and further, to reduce the manufacturing cost.

Figure 20A:
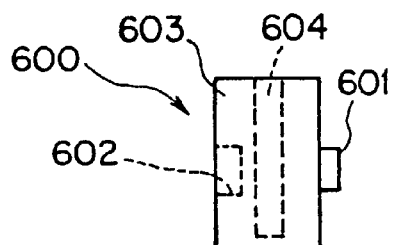
FIGS. 20A to 20C are illustrations of a structure of a holder according to a modification viewed from three sides.
Figure 20B:
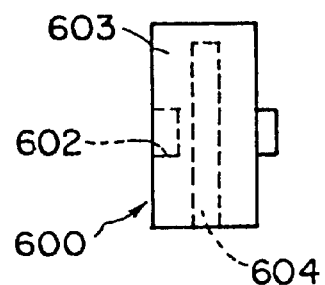
Figure 20C:
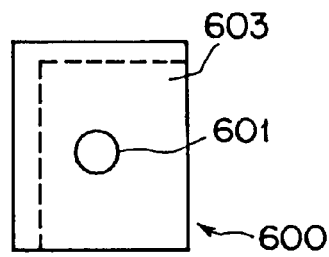

(C) Description of a First Modification of the First and Second Embodiments of this Invention Referring to FIGS. 20A to 20C and 21 to 23, a description will be given hereinbelow of a first modification of the above-described embodiments. FIGS. 20A to 20C are illustrations of a construction of a holder according to this modification viewed from three sides, and FIGS. 21 to 23 are perspective views useful for describing the construction of this holder.

In the holder designated at numeral 600, as shown in FIGS. 20A to 20C and 21 to 23, a notch portion 604 is continuously made in two surfaces of a holder member 603 having a rectangular parallelepiped configuration and made of a non-conductive material such as a resin, with the notch portion 604 having a width substantially equal to the thickness of the piece members 400, and a projection portion 601 is formed on one of side surfaces of the holder member 603 adjacent to both the surfaces in which the notch portion 604 is formed, and further, a recess portion 602 is made in the other side surface of the holder member 603 adjacent to both the surfaces carrying the notch portion 604.

Figure 21:
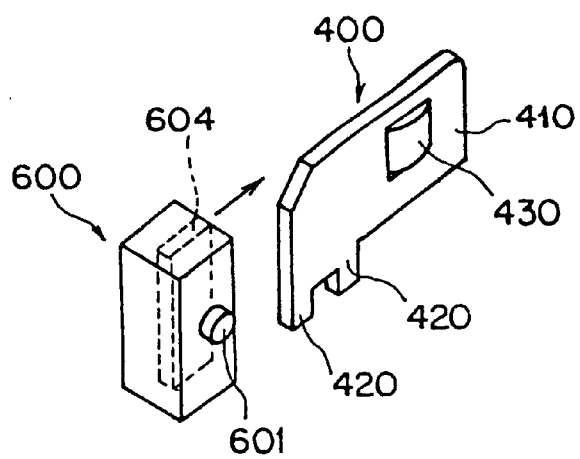
FIG. 21 is a perspective view useful for explaining a structure of a holder.
Figure 22:
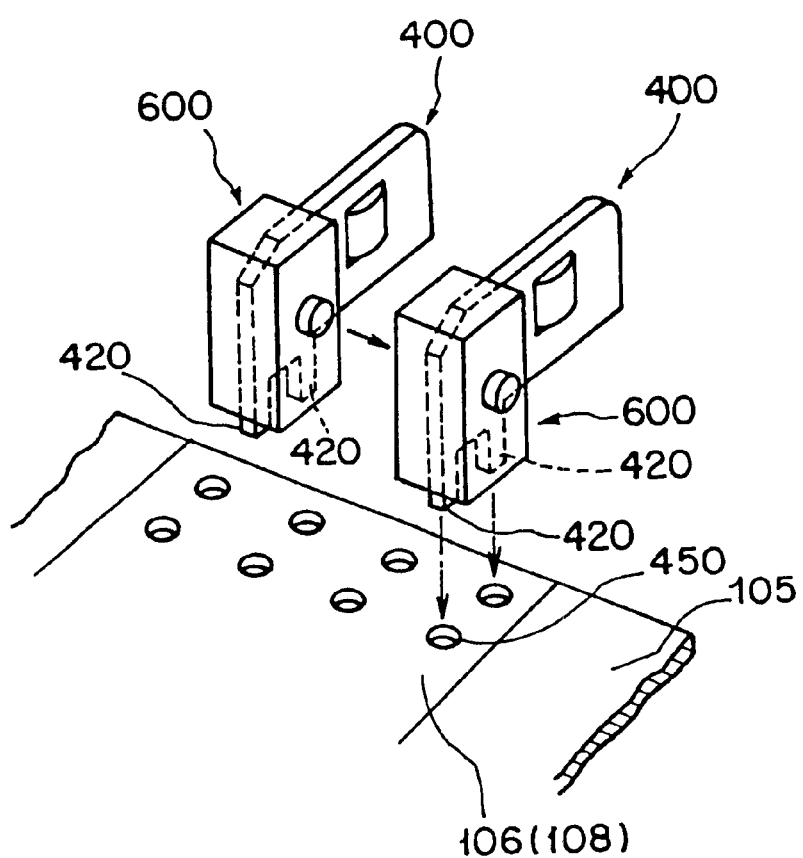
FIG. 22 is a perspective view useful for explaining a structure of the holder.

As shown in FIG. 21, the leg portion 420 side of the piece member 400 is fitted in the notch portion 604, and as shown in FIG. 22, the leg portions 420 of the piece member 400 is made to appear in a state of being placed in the notch portion 604.

Figure 23:
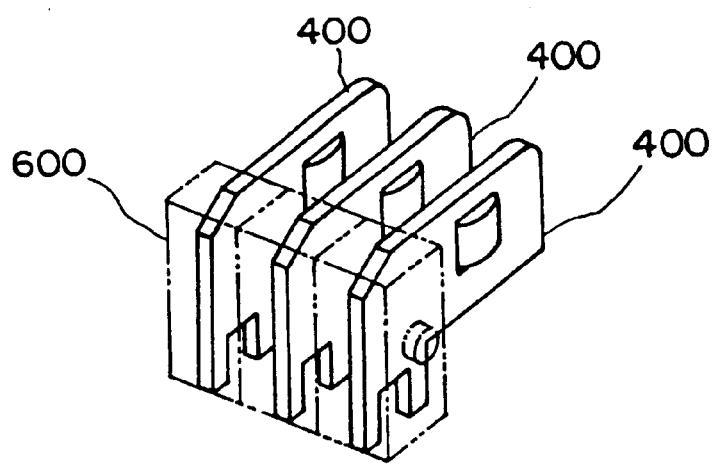
FIG. 23 is a perspective view useful for explaining a structure of the holder.

In addition, as shown in FIGS. 20A to 20C, the projection portion 601 and recess portion 602 on and in the holder member 603 are made at the nearly equal position or height in an opposed positional relation to each other, and as shown in FIGS. 22 and 23, the projection portions 601 and recess portions 602 of a plurality of holders 600 can be engaged with each other in a state where the piece members 400 are fitted in the holders 600, so that the adjacent holders 600 are coupled to each other.

Since the holder(s) 600 according to this modification is constructed as mentioned above, the leg portion 420 sides of the piece members 400 are fitted in the notch portions 604 of the holders 600, and the projection portions 601 and recess portions 602 of the adjacent holders 600 accommodating the piece members 400 are engaged with each other, and in this state, the leg portions 420 of the piece members 400 protruding from the holders 600 are put in connecting holes 450 made in a first connecting line 106 (third connecting line 108 or 108').

At this time, the adjacent holders 600 can support each other by their mutual connection, which prevents the piece members 400 from falling down.

Thus, if using the holders 600 according to this modification, since the holders 600 support each other by their mutual connection to prevent the piece members 400 from falling down, when the breaker unit 100 (100A, 100B) is inserted into the corresponding breaker unit mounting slot 550 of the power distributing apparatus 500 and the piece members 400 are fitted in the engaging hole portions 214 and 215 (218, 219) respectively made in the power conductive plate member 204 and CG conductive plate member 205 (SG conductive plate member 208 and FG conductive plate member 209) of the breaker unit mounting board 200 (200A) at the innermost end portion of the breaker unit mounting slot 550, the positional departures due to the falling-down of the piece members 400 do not occur, with the result that the mounting of the breaker unit 100 (100A) on the breaker unit mounting board 200 is surely achievable and the electrical connection is certainly feasible.

Figure 25:
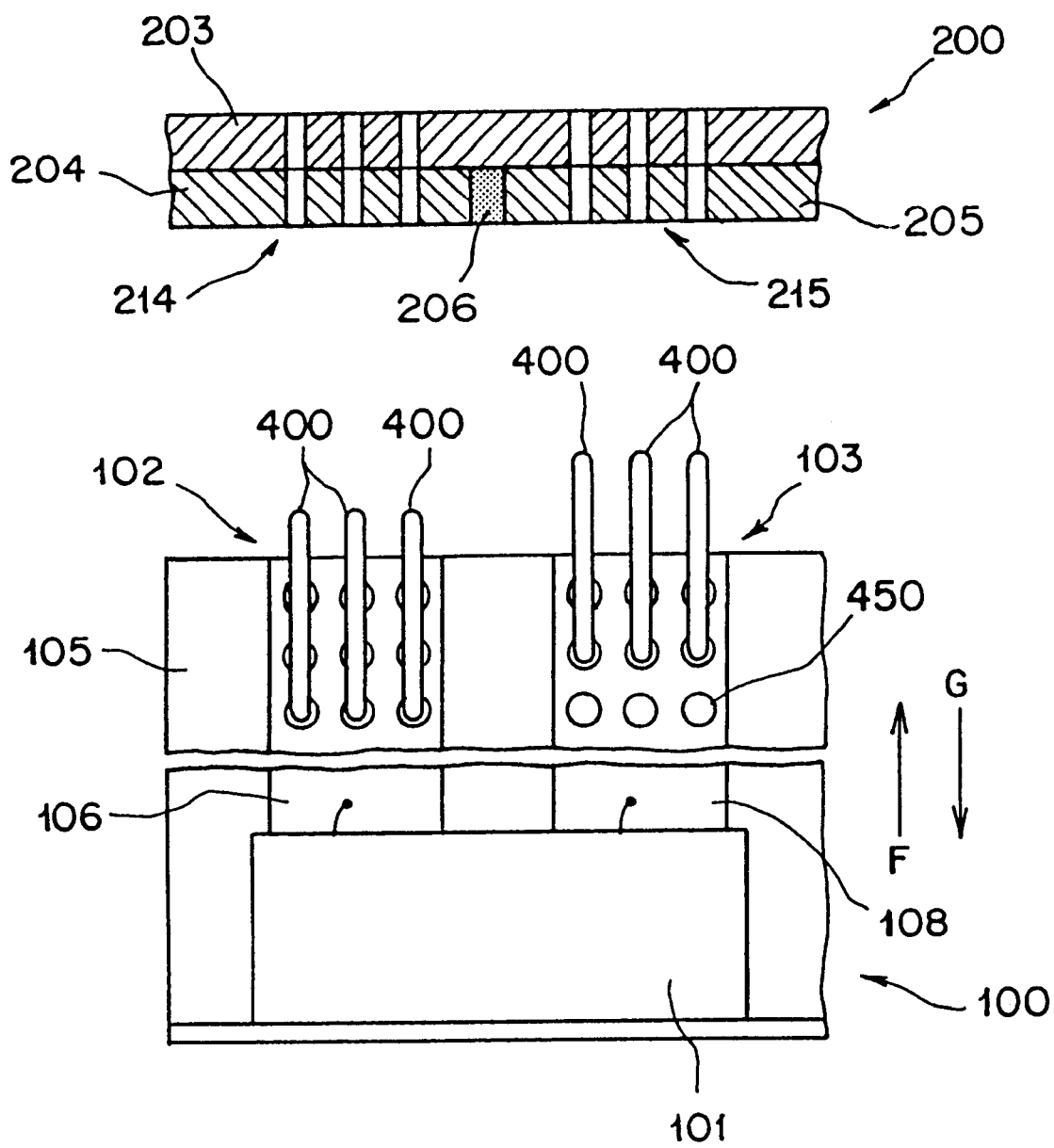
FIG. 25 is a partially broken top view illustratively showing a breaker unit.

(D) Description of a Second Modification of the First and Second Embodiments of this Invention FIG. 25 is a partially broken top view illustratively showing constructions in the vicinity of a power connecting part 102 and ground connecting part 103 of a breaker unit 100. In the breaker unit 100 according to the second modification, as shown in FIG. 25, in the power connecting part 102, leg portions 420 of piece members 400 are fitted in holes 450 in two rows, remoter from a power conductive plate member 204, of connecting holes 450 made at given intervals along directions perpendicular and parallel to a portion facing the power conductive plate member 204 to form a plurality of columns (3 columns in FIG. 25) and a plurality of rows (3 rows in FIG. 25), whereas in a ground connecting part 103, leg portions 420 of piece members 400 are put in holes 450 in two rows, closer to a CG conductive plate member 205, of connecting holes 450 made at given intervals along the directions perpendicular and parallel to the portion facing the power conductive plate member 204 to form a plurality of columns (3 columns in FIG. 25) and a plurality of rows (3 in FIG. 25).

Since the breaker unit 100 according to the second modification is constructed as mentioned above, when the breaker unit 100 is shifted in a direction indicated by an arrow F in FIG. 25 to be mounted on a breaker unit mounting board 200, the piece members 400 of the ground connecting part 103 are first fitted in engaging hole portions 215 made in the CG conductive plate member 205, and then, the piece members 400 of the power connecting part 102 are put in engaging hole portions 214 of the power conductive plate member 204.

On the other hand, when the breaker unit 100 is shifted along a direction indicated by an arrow G in FIG. 25 to be removed from the breaker unit mounting board 200, the piece members 400 of the power connecting part 102 are pulled out from the engaging hole portions 214 of the power conductive plate member 204 and then, the piece members 400 of the ground connecting part 103 are taken out from the engaging hole portions 215 of the CG conductive plate member 205.

That is, in the mounting the breaker unit 100 on the breaker unit mounting board 200, the connection between the ground connecting part 103 and the CG conductive plate member 205 is made prior to the connection between the power connecting part 102 and the power conductive plate member 204, whereas, in detaching the breaker unit 100 from the breaker unit mounting board 200, the releasing of the ground connecting part 103 and the CG conductive plate member 205 from their connecting condition is done after the releasing of the power connecting part 102 and the power conductive plate member 204 from their connecting condition.

Accordingly, with the breaker unit 100 according to the second modification, in the mounting/removal of the breaker unit 100 on/from the breaker unit mounting board 200, at the connection between the power connecting part 102 and the power conductive plate member 204 and the releasing from that connection, the ground connecting part 103 and the CG conductive plate member 205 are always connected to each other, and therefore, even in mounting/removing the breaker unit 100 on/from the breaker unit mounting board 200 in the hot-line condition, the earth line is securable, thus improving the safety.

(E) Others

In the above-described first embodiment, although, in the breaker unit mounting board 200 shown in FIG. 1, the power conductive plate member 204 has the mating power connecting part 214 comprising the engaging hole portions arranged to form three columns and the CG conductive plate member 205 has the engaging hole portions 215 arranged in three columns, the numbers of the engaging hole portions 214 and 215 are limited to these, for example, it is also acceptable that the power conductive plate member 204 (second conductive plate member 205) can have the mating power connecting part 214 (215) comprising the engaging hole portions arranged in six columns like the breaker unit mounting board 200 shown in FIG. 15, that is, various changes and modifications are acceptable which do not constitute departures from the spirit and scope of the invention.

Furthermore, although the above-described second modification is based upon the breaker apparatus according to the first embodiment, the second modification is not limited to this, and the breaker unit according to the second modification is also applicable to the breaker apparatus according to the second embodiment. In more detail, in the ground connecting part 103' of the breaker unit 100A, it is also appropriate that the leg portions 420 of the piece members 400 of at least one of the CG ground connecting section 103a, the SG ground connecting section 103b and the FG ground connecting section 103c are fitted in, of a plurality of columns of (3 columns in FIG. 25) connecting holes 450 made at a given interval along a direction normal to the portion facing the power conductive plate member 204, two rows of connecting holes 450 closer to the CG conductive plate member 205, the SG conductive plate member 208 or the FG conductive plate member 209. In this case, when the breaker unit 100A is attached/detached to/from the breaker unit mounting board 200A, at the connection between the power connecting part 102 and the power conductive plate member 204 and releasing from that connection, the ground connecting part 103' is always in connecting relation to at least any one of the CG conductive plate member 205, the SG conductive plate member 208 and the FG conductive plate member 209, so that the same effects are obtainable.

Still further, although, in the above-described embodiments, the electrical connection is made in a way that the piece members 400 are placed in the connecting holes 450, this invention is not limited to this, but it is also acceptable that the electrical connection is made with soldering or a conductive adhesive, that is, various changes and modifications are acceptable which do not constitute departures from the spirit and scope of the invention.

Besides, although, in the above-described embodiments, the piece members 400 are made from an electric conductive metallic plate, this invention is not limited to this, but it is also acceptable that the piece members 400 are constructed with a non-conductive material such as a resin and a conductive metallic thin-film (for example, tin or gold) is formed on their surfaces according to a depositing technique, a plating technique or the like, or that the plate members 400 are constructed in a manner that a conductive metallic plate is attached to at least one side surface portion of a plate-like member made of a conductive material such as a resin, that is, various changes and modifications are acceptable which do not constitute departures from the spirit and scope of the invention.

It should be understood that the present invention is not limited to the above-described embodiments, and that it is intended to cover all changes and modifications of the embodiments of the invention herein which do not constitute departures from the spirit and scope of the invention.

What is claimed is:

1. A breaker apparatus for breaking down power supplied from a power line to an object unit, comprising:
   (a) a breaker unit mounting board to be connected with the power line and a ground line; and
   (b) a breaker unit detachably mountable on said breaker unit mounting board; said breaker unit including
   (b1) a breaker part for breaking down the power supplied from the power line to the object unit,
   (b2) a power connecting part, connected with said breaker part and connectable to the power line when said breaker unit is mounted on said breaker unit mounting board, for connecting said breaker part to the power line,
   (b3) a first unit connecting part, connected with said breaker part and connectable to the object unit when said breaker unit is mounted on said breaker unit mounting board, for connecting the power line to the object unit through said power connecting part and said breaker part, (b4) a ground connecting part connectable to the ground line when said breaker unit is mounted on said breaker unit mounting board, and (b5) a second unit connecting part, connected with said ground connecting part and connectable to the object unit when said breaker unit is mounted on said breaker unit mounting board, for connecting the object unit to the ground line through said ground connecting part;

said breaker unit mounting board including (a1) a mating power connecting part connectable with said power connecting part of said breaker unit when said breaker unit is mounted on said breaker unit mounting board, for connecting said breaker part to the power line through both said power connecting part and said mating power connecting part, (a2) a mating ground connecting part connectable with said ground connecting part of said breaker unit when said breaker unit is mounted on said breaker unit mounting board, for connecting the object unit to the ground line through both said ground connecting part and said mating ground connecting part, (a3) a first connection mediating part through which said first unit connecting part is extendable to the object unit, when said breaker unit is mounted on said breaker unit mounting board, so that the object unit is connected to the power line, (a4) a second connection mediating part through which said second unit connecting part is extendable to the ground line, when said breaker unit is mounted on said breaker unit mounting board, so that the object unit is connected with the ground line, and (a5) an insulating plate member extending through the entire breaker unit mounting board, said mating power connecting part and said mating ground connection part being arranged on said insulating plate member in such a manner that said mating power connection part, said mating ground connection part, the power line and the ground line are insulated from one another with respect to said insulting plate member, both said first connection mediating part and said second connection mediating part extending across said insulating plate member from one side to the other side.

2. A breaker apparatus as defined in claim 1, wherein said breaker unit is equipped with said power connecting part, said first unit connecting part, said ground connecting part, said second unit connecting part and a board member on which disposed are a first connecting line for connecting said breaker part to said power connecting part, a second connecting line for connecting said breaker part to said first unit connecting part and a third connecting line for connecting said ground connecting part to said second unit connecting part.

3. A breaker apparatus as defined in claim 2, wherein said power connecting part is made up of a power connecting piece member having a piece portion and a leg portion formed such that at least their surface portions serve as electric conducting portions, and a first connecting part to be electrically connected to said leg portion of said power connecting piece member is formed in said first connecting line.

4. A breaker apparatus as defined in claim 3, wherein said first connecting part is provided with a plurality of connecting portions arranged at a given interval along a portion facing said mating power connecting part so that said first connecting part is electrically connectable to said leg portions of said plurality of power connecting piece members.

5. A breaker apparatus as defined in claim 4, further comprising a holder made to engage the adjacent power connecting piece members to each other.

6. A breaker apparatus as defined in claim 3, wherein said first connecting part is equipped with a plurality of connecting portions arranged at a predetermined interval along a direction crossing a portion facing said mating power connecting part to be electrically connectable to said leg portions of said power connecting piece members.

7. A breaker apparatus as defined in claim 3, wherein said mating power connecting part has engaging hole portion made to accommodate said power connecting piece members and electrically connected to said power line.

8. A breaker apparatus as defined in claim 2, wherein said ground connecting part is made up of a ground connecting piece member having at least one piece portion and a leg portion constructed such that at least at least their surface portion serve as electric conductive portions, and a second connecting part to be electrically connected to said leg portion of said ground connecting piece member is formed in said third connecting line.

9. A breaker apparatus as defined in claim 8, wherein said second connecting part is equipped with a plurality of connecting portions arranged at a predetermined interval along a portion facing said mating ground connecting part so that said second connecting part is electrically connectable a plurality of leg portions of a plurality of ground connecting piece members.

10. A breaker apparatus as defined in claim 9, further comprising a holder made to engage adjacent two or more of said plural ground connecting piece member to each other.

11. A breaker apparatus as defined in claim 8, wherein said second connecting part is equipped with a plurality of connecting portions arranged at a predetermined interval along a direction crossing a portion facing said mating ground connecting part to be electrically connectable to said leg portion of said ground connecting piece member.

12. A breaker apparatus as defined in claim 8, wherein said mating ground connecting part has engaging hole portion made to accommodate said ground connecting piece members and electrically connected to said ground line.

13. A breaker apparatus as defined in claim 12, wherein said first and second connection mediating parts are constructed as a connector through-hole for enabling said first connector and second connector part to be connected to each other.

14. A breaker apparatus as defined in claim 1, wherein said ground connecting part protrudes ahead of said power connecting part from one side of said breaker unit to be connected to said breaker unit mounting board such that, when said breaker unit is mounted on said breaker unit mounting board, a connection between said ground connecting part and said mating ground connecting part to a connection between said power connecting part and said mating power connection part while, when said breaker unit is removed from said breaker unit mounting board, releasing said ground connecting part and said mating ground connecting part from their connection is done after releasing said power connecting part and said mating power connecting part from their connection.

15. A breaker apparatus as defined in claim 14, wherein a connecting portion to said power supply line extending toward said unit side and a connecting portion to said ground line extending toward said unit side are mounted on a common second connector part, while said first connector part and said second connector part are made to be connectable to each other.

16. A breaker apparatus as defined in claim 1, wherein said first and second unit connecting parts are mounted on a first connector part common thereto.

17. A breaker apparatus as defined in claim 1, wherein said breaker unit mounting board is composed of said insulating plate member, a first conductive plate member mounted on one surface of said insulating plate member to constitute said mating power connecting part, a power line connecting part provided on another surface of said insulating plate member to be used for said power line, a second conductive plate member mounted on one surface of said insulating plate member to constitute said mating ground connecting part, and a ground line connecting part provided on another surface of said insulating plate member to be used for said ground line.

18. A breaker apparatus as defined in claim 1, wherein said ground connecting part is constructed as a ground connecting part to be connected to one type of ground line.

19. A breaker apparatus as defined in claim 1, wherein said ground connecting part is constructed as a ground connection part to be connected to a plurality of types of ground lines.

20. A breaker apparatus as defined in claim 1, wherein said breaker part is constructed as a non-fuse breaker.

21. A breaker apparatus comprising:

a breaker unit including:

a breaker part for supplying/cutting off power;

a power connecting part for connecting said breaker part to a power line;

a first unit connecting part for supplying power through said breaker part to a unit side;

a ground connecting part to be connected to a ground line; and a second unit connecting part for supplying said unit side through said ground connecting part to said ground line, and a breaker unit mounting board including;

a mating power connecting part on which said power connecting part is detachably mountable, with said mating power connecting part connecting said power connecting part to said power line when said power connecting part is mounted on said mating power connecting part;

a mating ground connecting part on which said ground connecting part is detachably mountable, with said mating ground connecting part connecting said ground connecting part to said ground line when said ground connecting part is mounted on said mating ground connecting part;

a first connection mediating part allowed to connect a power supply line extending toward said unit side and said first unit connecting part; and a second connection mediating part allowed to connect a ground line extending toward said unit side to said second unit connecting part;

wherein said ground connecting part is equipped with a ground fixed connection portion to be fixedly connected to one type of ground line and a connecting switch portion allowed to connect said ground fixed connection portion to a different type of ground line.

22. A breaker apparatus for breaking down power supplied from a power line to one or more object units selectively, comprising:

(a) a breaker unit mounting board to be connected with the power line and a ground line; and (b) one or more breaker units detachably mountable on said breaker unit mounting board, each of said breaker units including (b1) a non-fuse breaker part for breaking down supplied from the power line to a respective one of the object units, (b2) a power connecting part, connected with said non-fuse breaker part and connectable with the power line when each said breaker unit is mounted on said breaker unit mounting board, for connecting said non-fuse breaker part to the power line, said power connection part being composed of a power connecting piece member having a piece portion and a leg portion formed so that at least their surface portions serve as conductive portions, (b3) a ground connecting part connectable with the ground line when each said breaker unit is mounted on said breaker unit mounting board, said ground connecting part being composed of a ground connecting piece member having a piece portion and a leg portion formed such that at least their surface portions serve as conductive portions, (b4) a unit connecting part, connected with said ground connecting part and connectable with the object unit when each said breaker unit is mounted on said breaker unit mounting board, for connecting the respective one object unit to the ground line, and (b5) a substrate member supporting said breaker part, said power connecting part, said ground connecting part and said unit connecting part, said substrate member carrying a fourth connecting line having a first engaging portion for making a connection between said non-fuse breaker part and said power connecting part and allowed to engage with said leg portion of said power connecting piece member and a fifth connecting line for making a connection between said non-fuse breaker part and said unit connecting part and a connection between said ground connecting part and said unit connecting part;

said breaker unit mounting board including (a2) a mating ground connecting part having an engaging hole portion that is engageable with the ground connecting piece member of the individual breaker unit and electrically connectable with the ground line, when the individual breaker unit is mounted on said breaker unit mounting board, for connecting the respective object unit to the ground line through said ground connecting part of the individual breaker unit and said mating ground connecting part, (a3) a connection mediating part through which said unit connecting part is extendable to the ground line, when the individual breaker unit is mounted on said breaker unit mounting board, for connecting the respective object unit to the ground line through both said unit connecting part and said connection mediating part, and (a4) an insulting plate member extending through the entire breaker unit mounting board, said mating power connecting part and said mating ground connection part being arranged on said insulting plate member in such a manner that said mating power connection part, said mating ground connection part, the power line and the ground line are insulated from one another with respect to said insulating plate member, both said first connection mediating part and said second connection mediating part extending across said insulating plate member from one side to the other side.

23. A breaker unit, which is detachably mountable on a breaker unit mounting board to constitute a breaker apparatus, for breaking down power supplied from a power line to an object unit, the mounting board being to be connected with the power line and a ground line and including a mating power connecting part in the form of one or more complementary-to-plate-shape engaging hole portions, a mating ground connecting part in the form of one or more complementary-to-plate-shape engaging hole portions, a first connection mediating part, a second connection mediating part, and an insulating plate member extending through the entire breaker unit mounting board, said breaker unit comprising;

(a) a breaker part for breaking down the power supplied from the power line to the object unit, when said breaker unit is mounted on the mounting board;

(b) a power connecting part, connected with said breaker part and connectable with the power line, for connecting said breaker part to the power mating power connecting part of the mounting board when said breaker unit is mounted on the mounting board, through booth said power connecting part and the mating power connecting part of the mounting board, said power connecting part being composed of one or more plate-shaped piece members, that are fittable one in each of the complementary-to-plate-shape engaging hole portions of the mating power connecting part of the mounting board when said power connecting part is connected with the mating power connecting part, at least surface portions of said plate-shaped piece members serving as electric conducting portions when said plate-shaped piece members are fitted in the respective first-named complementary-to-plate-shape engaging holes portions;

(c) a first unit connecting part, connecting with said part and extendable to the object unit, through the first connecting mediating part of the mounting board when said breaker unit is mounted on the mounting board for connecting said breaker part to the object unit and hence connecting the object unit to the power line through said breaker part and said power connecting part;

(d) a ground connecting part connectable with the mating ground part of the mounting board when said breaker unit is mounted on the mounting board, said ground connecting part being composed of one or more plate-shaped piece members that are fittable one in each of the complementary-to-plate-shape engaging hole portions of the mating ground connecting part of the mounting board when said ground connecting part is connected with the mating ground connecting part, at least surface portions of said plate-shaped piece members serving as electric conducting portions when said plate-shape piece members are fitted in the respective second-named complementary-to-plate-shape engaging hole portions;

e) a second unit connecting part, connected with said ground connecting part and extendable to the ground line through the second connecting mediating part of the mounting board when said breaker unit is mounted on the mounting board, for connecting said ground connecting part to the object unit and hence connecting the object unit to the ground line through said ground connecting part; and f) a substrate member, on which breaker part, said power connecting part and said ground connecting part are disposed and having one or more connecting holes;

wherein each of said plate-shaped piece members, which compose said power connecting part and said ground connecting part, having one or more leg portions fittable into said one or more connecting holes of said substrate member so that each said plate-shaped piece member is detachable mounted to said substrate member.

24. A breaker unit, which is detachably mountable on a breaker unit mounting board to constitute a breaker apparatus, for breaking down power supplied from a power line to an object unit, the mounting board being connected with the power line and a ground line and including a mating power connecting part in the form of one or more complementary-to-plate-shape engaging hole portions, a mating ground connecting part in the form of one or more complementary-to-plate-shape engaging hole portions, a first connection mediating part, a second connection mediating part, and an insulating plate member extending through the entire breaker unit mounting board, said breaker unit comprising:

(a) a breaker part for breaking down the power supplied from the power line to the object unit, when said breaker unit is mounted on the mounting board;

(b) a power connecting part, connected with said breaker apart and connectable with the power line, for connecting said breaker part to the mating power connecting part of the mounting board when said breaker unit is mounted on the mounting board, through both said power connecting part and the mating power connecting part of the mounting board, said power connecting part being composed of one or more plate-shaped piece members, that are fittable one in each of the complementary-to-plate-shaped engaging hole portions of the mating power connecting part of the mounting board when said power connecting part is connected with the mating power connecting part, at least surface portions of said plate-shaped piece members serving as electric conducting portions when said plate-shaped piece members are fitted in the respective first-named complementary-to-plate-shaped engaging hole portions, said plate-shaped piece members of said power connecting part having a plate-spring-like contact portion that is formed substantially centrally of each said plate-shaped piece member and serves as a plate spring;

(c) a first unit connecting part, connected with said breaker part and extendable to the object unit, through the first connecting mediating part of the mounting board when said breaker unit is mounted on the mounting board, for connecting said breaker part to the object unit and hence connecting the object unit to the power line through said breaker part and said power connecting part;

(d) a ground connecting part connectable with the mating ground part of the mounting board when said breaker unit is mounted on the mounting board, said ground connecting part being composed of one or more plate-shaped piece members that are fittable one in each of the mounting board when said ground connecting part is connected with the mating ground connecting part, at least surface portions of said plate-shaped piece members serving as electric conducting portions when said plate-shape piece members are fitted in the respective second-named complementary-to-plate-shape enagaging hole portions; and (e) a second unit connecting part, connected with said ground connecting part and extendable to the ground line through the second connecting mediating part of the mounting board when said breaker unit is mounted on the mounting board, for connecting said ground connecting part to the object unit and hence connecting the object unit to the ground line through said ground connecting part.

25. A breaker unit, which is detachably mountable on a breaker unit mounting board to constitute a breaker apparatus, for breaking down power supplied from a power line to an object unit, the mounting board being connected with the power line and a ground line and including a mating power connecting part in the form of one or more complementary-to-plate-shape engaging hole portions, a mating ground connecting part in the form of one or more complementary-to-plate-shape engaging hole portions, a first connection mediating part, a second connection mediating part, and an insulating plate member extending through the entire breaker unit mounting board, said breaker unit comprising:

(a) a breaker part for breaking down the power supplied from the power line to the object unit, when said breaker unit is mounted on the mounting board;

(b) a power connected with said breaker part and connectable with the power line, for connecting said breaker part to the mating power connecting part of the mounting board when said breaker unit is mounted on the mounting board, through both said power connecting part and the mating power connecting part of the mounting board, said power connecting part being composed of one or more plate-shaped piece members, that are fittable one in each of the complementary-to-plate-shape engaging hole portions of the mating power connecting part of the mounting board when said power connecting part is connected with the mating power connecting part, at least surface portions of said plate-shaped piece members serving as electric conducting portions when said plate-shaped piece members are fitted in the respective first-named complementary-to-plate-shape engaging hole portions;

(c) a first unit connecting part, connected with said breaker part and extendable to the object unit, through the first connecting mediating part of the mounting board when said breaker unit is mounted on the mounting board, for connecting said breaker part to the object unit and hence connecting the object unit to the power line through said breaker part and said power connecting part;

(d) a ground connecting part connectable with the mating ground part of the mounting board when said breaker unit is mounted on the mounting board, said ground connecting part being composed of one or more plate-shaped piece members that are fittable one in each of the complementary-to-plate-shape engaging hole portions of the mating ground connecting part of the mounting board when said ground connecting part is connected with the mating ground connecting part, at least surface portions of said plate-shaped piece members serving as electric conducting portions when said plate-shape piece members are fitted in the respective second-named complementary-to-plate-shape engaging hole portions, said plate-shaped piece members of said ground connecting part having a plate-spring-like contact portion that is formed substantially centrally of each said plate-shaped piece member and serves as a plate spring; and (e) a second unit connecting part, connected with said ground connecting part and extendable to the ground line through the second connecting mediating part of the mounting board when said breaker unit is mounted on the mounting board, for connecting said ground connecting part to the object unit hand hence connecting the object unit to the ground line through said ground connecting apart.

26. A breaker unit, which is detachably mountable on a breaker unit mounting board to constitute a breaker apparatus, for breaking down power supplied from a power line to an object unit, the mounting board being connected with the power line and a ground line and including a mating power connecting part in the form of one or more complementary-to-plate-shape engaging hole portions, a mating ground connecting part in the form of one or more complementary-to-plate-shape engaging hole portions, a first connection mediating part, a second connection mediating part, and an insulating plate member extending through the entire breaker unit mounting board, said breaker unit comprising:

(a) a breaker part for breaking down the power supplied from the power line to the object unit, when said breaker unit is mounted on the mounting board;

(b) a power connecting part, connected with said breaker part and connectable with the power line, for connecting said breaker part to the power mating connecting part of the mounting board when said breaker unit is mounted on the mounting board, through both said power connecting part and the mating power connecting part of the mounting board, said power connecting part being composed of one or more plate-shaped piece members, that are fittable one in each of the complementary-to-plate-shape engaging hole portions of the mating power connecting part of the mounting board when said power connecting part is connected with the power mating connecting part, at least surface portions of said plate-shaped place members serving as electric conducting portions when said plate-shaped piece members are fitted in the respective first-named complementary-to-plate-shaped piece members are fitted in the respective first-named complementary-to-plate-shaped said plate-shaped piece members are fitted in the respective first-named complementary-to-plate-shape engaging hole portions, said plate-shaped members of said power connecting part having a plate-spring-like contact portion that is formed substantially centrally of each said plate-shaped piece member and serves as a plate spring;

(c) a first unit connecting part, connected with said breaker part and extendable to the object unit, through the first connecting mediating part of the mounting board when said breaker unit is mounted on the mounting board, for connecting said breaker part to the object unit and hence connecting the object unit to the power line through said breaker part and said power connecting part;

(d) a ground connecting part connectable with the mating ground part of the mounting board when said breaker unit is mounted on the mounting board, said ground connecting part being composed of one or more plate-shaped piece members that are fittable one in each of the complementary-to-plate-shape engaging hole portions of the mating ground connecting part of the mounting board when said ground connecting part is connected with the mating ground connecting part, at least surface portions of said plate-shaped piece members serving as electric conducting portions when said plate-shape piece members are fitted in the respective second-named complementary-to-plate-shape engaging hole portions, said plate-shaped piece members of said ground connecting part having a plate-spring-like contact portion that is formed substantially centrally of each said plate-shaped piece member and serves as a plate spring; and (e) a second unit connecting part, connected with said ground connecting part and extendable to the ground line through the second connecting mediating part of the mounting board when said breaker unit is mounted on the mounting board, for connecting said ground connecting part to the object unit and hence connecting the object unit to the ground line through said ground connecting part; wherein said ground connecting part projects to the mounting board and then to said power connecting part, so that a connection between said ground connecting part and said mating ground connecting part is made prior to a connection between said power connecting part and said mating power connecting part, while when said breaker unit is removed from said breaker unit mounting board, releasing said ground connecting part and said mating ground connecting part from their connection is done after releasing said power connecting part and said mating power connecting part from their connection.

27. A breaker unit, which is detachably mountable on a breaker unit mounting board to constitute a breaker apparatus, for breaking down power supplied from a power line to an object unit, the mounting board being connected with the power line and a ground line and including a mating power connecting part in the form of one or more complementary-to-plate-shape engaging hole portions, a first connection mediating part, a second connection mediating a part, and an insulating plate member extending through the entire breaker unit mounting board, said breaker unit comprising:

(a) a breaker part for breaking down the power supplied from the power line to the object unit, when said breaker unit is mounted on the mounting board;

(b) a power connecting part, connected with said breaker part and connectable with the power line, for connecting said breaker part to the power mating connecting part of the mounting board when said breaker unit is mounted on the mounting board, through both said power connecting part and the mating power connecting part of the mounting board, said power connecting part being composed of two or more plate-shaped piece members, that are fittable one in each of the complementary-to-plate-shape engaging hole portions of the mating power connecting part of the mounting board when said power connecting part is connected with the power mating connecting part, at least surface portions of said plate-shaped place members serving as electric conducting portions when said plate-shaped piece members are fitted in the respective first-named complementary-to-plate-shape engaging hole portions;

(c) a first unit connecting part, connected with said breaker part and extendable to the object unit, through the first connecting mediating part of the mounting board when said breaker unit is mounted on the mounting board for connecting said breaker part to the object unit and hence connecting the object unit to the power line through said breaker part and said power connecting part;

(d) a ground connecting part connectable with the mating ground part of the mounting board when said breaker unit is mounted on the mounting board, said ground connecting part being composed of two or more plate-shaped piece members that are fittable one in each of the complementary-top-plate-shape engaging hole portions of the mating ground connecting part of the mounting board when said ground connecting part is connected with the mating ground connecting part, at least surface portions of said plate-shaped piece members serving as electric conducting portions when said plate-shape piece members are fitted in the respective second-named complementary-to-plate-shape engaging hole portions; and (e) a second unit connecting part, connected with said ground connecting part and extendable to the ground line through the second connecting mediating part of the mounting board when said breaker unit is mounted on the mounting board, for connecting said ground connecting part to the object unit and hence connecting the object unit to the ground line through said ground connecting part.

* * * * *